United States Patent
Glucksman et al.

(10) Patent No.: US 9,192,260 B2
(45) Date of Patent: Nov. 24, 2015

(54) APPARATUS AND METHOD FOR INFUSING HOT BEVERAGES

(71) Applicants: Dov Z Glucksman, Danvers, MA (US); Gary P. McGonagle, Lynn, MA (US); Laura J. Nickerson, Fitchburg, MA (US)

(72) Inventors: Dov Z Glucksman, Danvers, MA (US); Gary P. McGonagle, Lynn, MA (US); Laura J. Nickerson, Fitchburg, MA (US)

( * ) Notice: Subject to any disclaimer, the term of this patent is extended or adjusted under 35 U.S.C. 154(b) by 158 days.

(21) Appl. No.: 14/186,293

(22) Filed: Feb. 21, 2014

(65) Prior Publication Data

US 2014/0242224 A1 Aug. 28, 2014

Related U.S. Application Data

(60) Provisional application No. 61/768,445, filed on Feb. 23, 2013.

(51) Int. Cl.
*H05B 6/80* (2006.01)
*A47J 31/32* (2006.01)

(52) U.S. Cl.
CPC ........................ *A47J 31/32* (2013.01)

(58) Field of Classification Search
CPC .......... H05B 6/802; H05B 6/80; B01J 19/126
USPC ......... 99/300, 275–323.3; 426/431, 433, 435; 219/687–689
See application file for complete search history.

(56) References Cited

U.S. PATENT DOCUMENTS

| | | | |
|---|---|---|---|
| 3,371,592 A | | 3/1968 | Remy et al. |
| 4,094,233 A | * | 6/1978 | Martin ............................ 99/305 |
| 6,082,247 A | | 7/2000 | Beaulicu |
| 6,142,063 A | | 11/2000 | Beaulieu et al. |
| 6,666,130 B2 | | 12/2003 | Taylor et al. |
| 7,398,726 B2 | | 7/2008 | Streeter et al. |
| 7,640,845 B2 | | 1/2010 | Woodnorth et al. |
| 8,375,845 B2 | | 2/2013 | Huiberts |
| 2005/0160918 A1 | | 7/2005 | Winstanley et al. |
| 2006/0021515 A1 | * | 2/2006 | Graviss et al. ................. 99/279 |
| 2006/0174773 A1 | | 8/2006 | Taylor |
| 2006/0196363 A1 | | 9/2006 | Rahn |
| 2006/0249035 A1 | | 11/2006 | Lin |
| 2007/0186780 A1 | | 8/2007 | Clark |
| 2008/0095904 A1 | | 4/2008 | Sullivan et al. |
| 2008/0115674 A1 | | 5/2008 | Huang et al. |
| 2008/0121112 A1 | * | 5/2008 | Dworzak et al. ............. 99/323.1 |
| 2008/0134902 A1 | | 6/2008 | Zimmerman et al. |
| 2011/0281000 A1 | | 11/2011 | Vergani et al. |
| 2012/0121769 A1 | | 5/2012 | Castellani et al. |
| 2012/0125205 A1 | * | 5/2012 | Glucksman et al. ........ 99/302 R |

* cited by examiner

*Primary Examiner* — Tu B Hoang
*Assistant Examiner* — Thomas Ward
(74) *Attorney, Agent, or Firm* — Frank Marino

(57) ABSTRACT

A hot beverage brewing apparatus including a pressurized hot water delivery system to provide liquid under pressure within a range of acceptable infusion temperatures without a water pump. A fresh water tank is situated above a water heater in liquid communication to maintain the water heater filled. Water in the water heater is kept at a pre-infusion temperature. When infusion process is to commence the user selects volume of water to be dispensed into infusion material, water is rapidly heated to infusion temperature and displaced from water heater by pressurised air from air pump. At the end of the brew cycle the air pump is stopped and a valve connects the water heater to atmospheric pressure to facilitate water flow from the fresh water tank into the water heater. After the infusion process an air valve may direct air from the air pump to the infusible material to dry it for ease of disposal.

17 Claims, 19 Drawing Sheets

US 9,192,260 B2

APPARATUS AND METHOD FOR INFUSING HOT BEVERAGES

RELATED APPLICATION

This application is a non-Provisional Continuation of U.S. Provisional Application No. 61/768,445 filed on Feb. 23, 2013, the teachings of which are incorporated herein in their entirety by reference.

FIELD OF THE INVENTION

This invention generally relates to an electric appliance for infusing beverages. More specifically this invention relates to a method and apparatus for infusing material, such as ground coffee beans, a cup at a time, with varying volumes of hot water.

BACKGROUND OF THE INVENTION

Coffee brewers where the user is able to select the volume of water used for brewing have become very popular in the past ten years. Many of these coffee brewers utilize a pre-packaged coffee pod, cartridge or capsule. Pre-packaged coffee pods, cartridges or capsules include a measured portion of ground coffee packaged in a structure that constrains the coffee while permitting hot water to flow through for extraction of flavor and aroma from the ground coffee.

It has become a prerequisite in brewing a cup at a time that the brew cycle remains short, preferably between 30 and 60 seconds and, during which time up to 300 milliliters of hot water must be channeled through the coffee pods, cartridges or capsules, and pass through a dense bed of coffee grounds. This results in a high flow rate that creates a high hydraulic resistance to the flow of water through the coffee pods, cartridges or capsules and the grounds therein. Therefore, the water has to be delivered to the coffee pod or capsule under an elevated pressure to be able to flow through the coffee pods, cartridges or capsules in a short amount of time. It has also become a prerequisite in brewing a cup at a time to use varying amounts of water according to the drinking habits of the user (some like to use small amounts of water resulting in an extra strong cup of coffee, others like their coffee diluted, thereby using larger volume of water). It is also a prerequisite that the volume of water delivered remains within a close tolerance of what is selected by the user. Another prerequisite in brewing a cup at a time is the desire to minimize the wait between each brewing cycle, Brewing under pressure requires that the coffee brewing appliance contain a pump for elevating the water pressure to permit it to flow during the short brewing cycle through the dense coffee pod or capsule, as mentioned above. Typically electromagnetic pumps are being used in most such coffee brewing appliances. These pumps generate the water pressure needed by incorporating a reciprocating steel core that is activated by an electromagnetic field generated through an electric coil surrounding the core. There are many such pump designs, one typical such pump is described in U.S. Pat. No. 4,389,169. The typical electromagnetic pump for use in such coffee brewing appliances delivers about 600 ml per minute (Approximately 20 fl. oz. per minute), while developing a head of approximately 1 atmosphere (Approximately 14-15 PSI). This type of pump requires very tight manufacturing tolerances and high quality materials and is therefore expensive in relationship to the rest of the coffee brewer parts. Typically such pumps cost $4.00 to $6.00, even when purchased in very large quantities. Electromagnetic pumps are also known to generate a loud vibration sound.

Because of the cost and noise issues designers of single serve coffee brewers have attempted to come up with alternative designs to eliminate the use of such a pump in coffee brewers, in a number of ways, for example:

U.S. patent application Ser. No. 11/123,038 discloses a brewer incorporating a water heater, which can be hermetically sealed after filling it with water. In such a water heater water is heated to a temperature which corresponds with the pressure of 1 atmosphere above room pressure in order to use that pressure to drive the heated water through the dense pod for extracting the coffee flavor and aroma. Unfortunately, to elevate the water pressure by one atmosphere the water has to be heated to a temperature of about 120° Centigrade, which is too high a temperature for brewing coffee. The coffee brewed at that temperature is bitter and lacks aroma. Ideally, coffee should be brewed at about 92 Centigrade.

U.S. Pat. No. 8,180,204 discloses a design that uses a sealed water heater divided into two compartments one containing hot water the other containing water at room temperature and means for mixing water as it exits the water heater to maintain a resultant temperature of about 92 C.

U.S. Pat. Nos. 3,371,592, 6,082,247, 6,142,063, 6,666,130, 7,398,726, 7,640,845, and U.S. patent applications Ser. Nos. 11/393,615, 11/055,411, and 11/548,676 disclose coffee brewers that utilize an air pump that pressurizes the water container and causes the water to be delivered under pressure into the brew chamber containing the pod, cartridge or capsule. The coffee brewers described in these patents tend to be very complicated and subsequently would be expensive to produce, because of the large number of components used in the apparatus described in the patents listed here. These coffee brewers would also tend to be large to contain all the components, and will require a lot kitchen counter space. Also, owing to their large size these coffee brewers would be expensive to ship from their manufacturing venue (primarily China) to the market (primarily North America).

U.S. patent applications Ser. Nos. 11/899,952, 11/899,966, and 11/899,956 disclose a relatively compact single serve coffee brewer employing an air pump to pressurize the water heater for delivering water to the brew chamber. However the brewers disclosed do not include a cold water tank, requiring that the user refills the brewer with water before the brewer is to be used. Resulting in a long wait for the water to heat up, and the inconvenience associated with the need to refill water before each brewing cycle.

Most coffee brewers for brewing a cup at a time include flow meters through which the water flows to determine at all times the volume of water being delivered for infusion. Typically such flow meters are known as "turbine flow meters" as they incorporate a free spinning bladed wheel upon which water is injected to cause such wheel to turn in response to the velocity of water. A magnet is embedded in the hub of the wheel and a magnetic pick up exterior to the flow meter housing relays the number of turns to the control circuit. U.S. Pat. No. 8,375,845 as well as publications 20050160918, 20110281000, and 20120121769 make reference to such flow meters being used in hot beverage brewers. A flow meter that is frequently used in hot beverage brewers is Model No PVDF flow meter distributed by Daitron (www.daitron.com)

Reference is also made to pending, co-invented, and co-owned U.S. Utility patent application Ser. No. 13/297,625, the teachings of which are incorporated herein in their entirety by reference.

OBJECTS OF THE INVENTION

Therefore it is an object of this invention to provide a hot beverage brewing apparatus and method capable of brewing a cup of coffee at a time under pressure without the use of a water pump for pressurizing the water.

It is a further object of this invention to provide a hot beverage brewing apparatus and method suitable for delivering water to the brew chamber at a temperature ranging between 90 and 95 Centigrade.

It is a further object of this invention to provide a hot beverage brewing apparatus that includes a cold water reservoir and yet is compact.

It is a further object of this invention to provide a hot beverage brewing apparatus and method where more than one pre-set volume of hot beverage is provided.

It is a further object of this invention to provide a hot beverage brewing apparatus and method where the more than one pre-set volume of hot beverage is precise and repeatable from cycle to cycle.

It is a further object of this invention to provide a hot beverage brewing apparatus that is inexpensive to manufacture It is a further object of this invention to provide a hot beverage brewing apparatus that has few moving parts.

It is a further object of this invention to provide a hot beverage brewing apparatus and method that requires very simple controls yet satisfies all the functionality and safety requirements typical of coffee makers.

It is a further object of this invention to provide a hot beverage brewing apparatus that is simple and convenient to operate and will deliver properly brewed cups of coffee in rapid succession.

It is a further object of this invention to provide a hot beverage brewing apparatus and method where air is directed to the infusible material at the end of the brew cycle to drive out any excess water.

It is a further object of this invention to provide a hot beverage brewing apparatus and method which conserves energy.

SUMMARY OF THE INVENTION

While not limited thereto, the invention may be embodied in a method and/or apparatus for using capsules or cartridges containing infusible material, such as ground coffee beans, for infusing beverages under pressure.

BRIEF DESCRIPTION OF THE DRAWINGS

The various objects, advantages and novel features of this invention will be more fully apparent from a reading of the following detailed description of an exemplary embodiment thereof, in conjunction with the accompanying drawings in which like reference numerals refer to like parts, and in which.

DESCRIPTION OF AN EXEMPLARY EMBODIMENT

Figure 1:
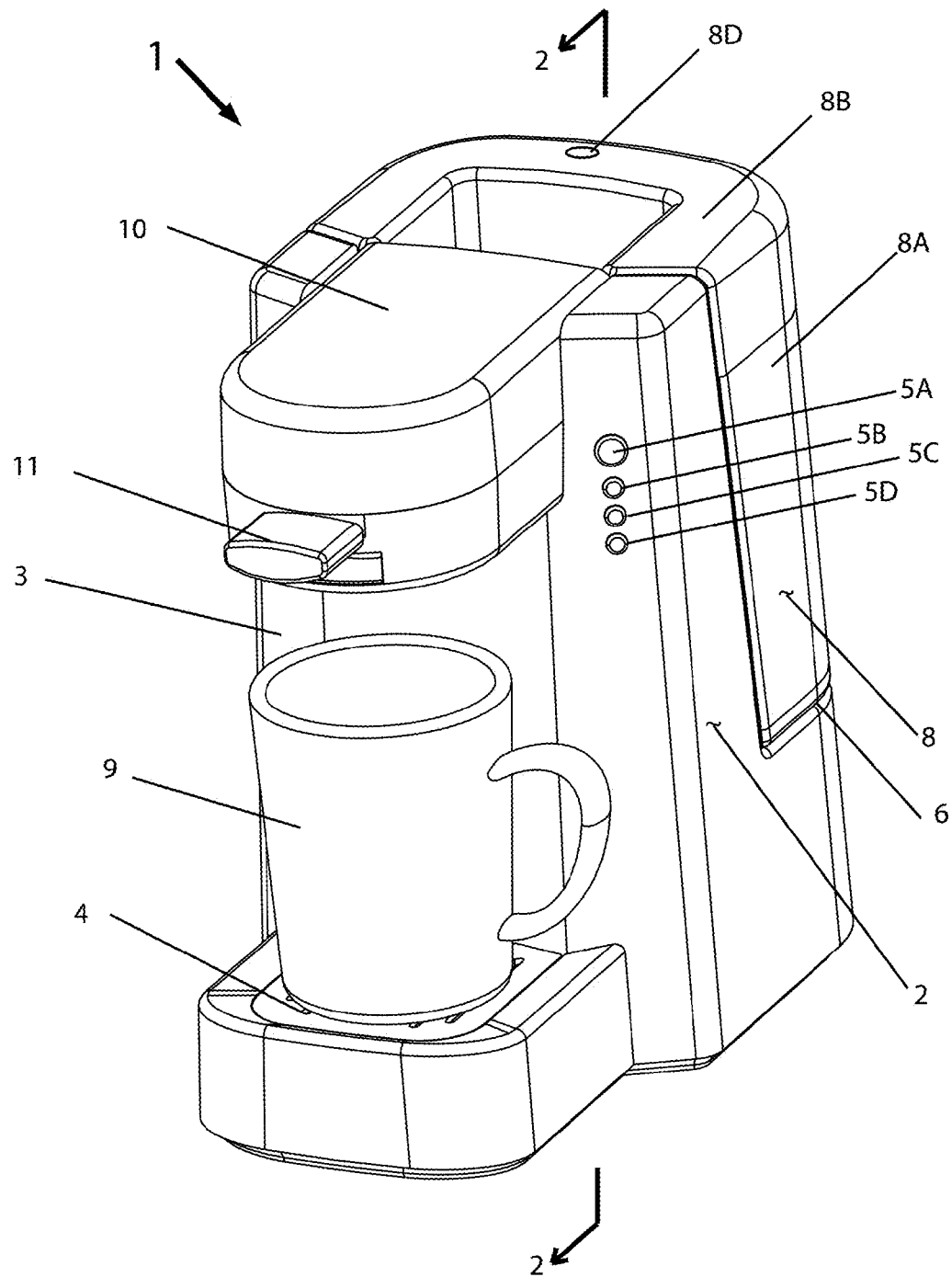
FIG. 1 is an isometric view of a coffee brewing apparatus according to the invention.
Figure 2:
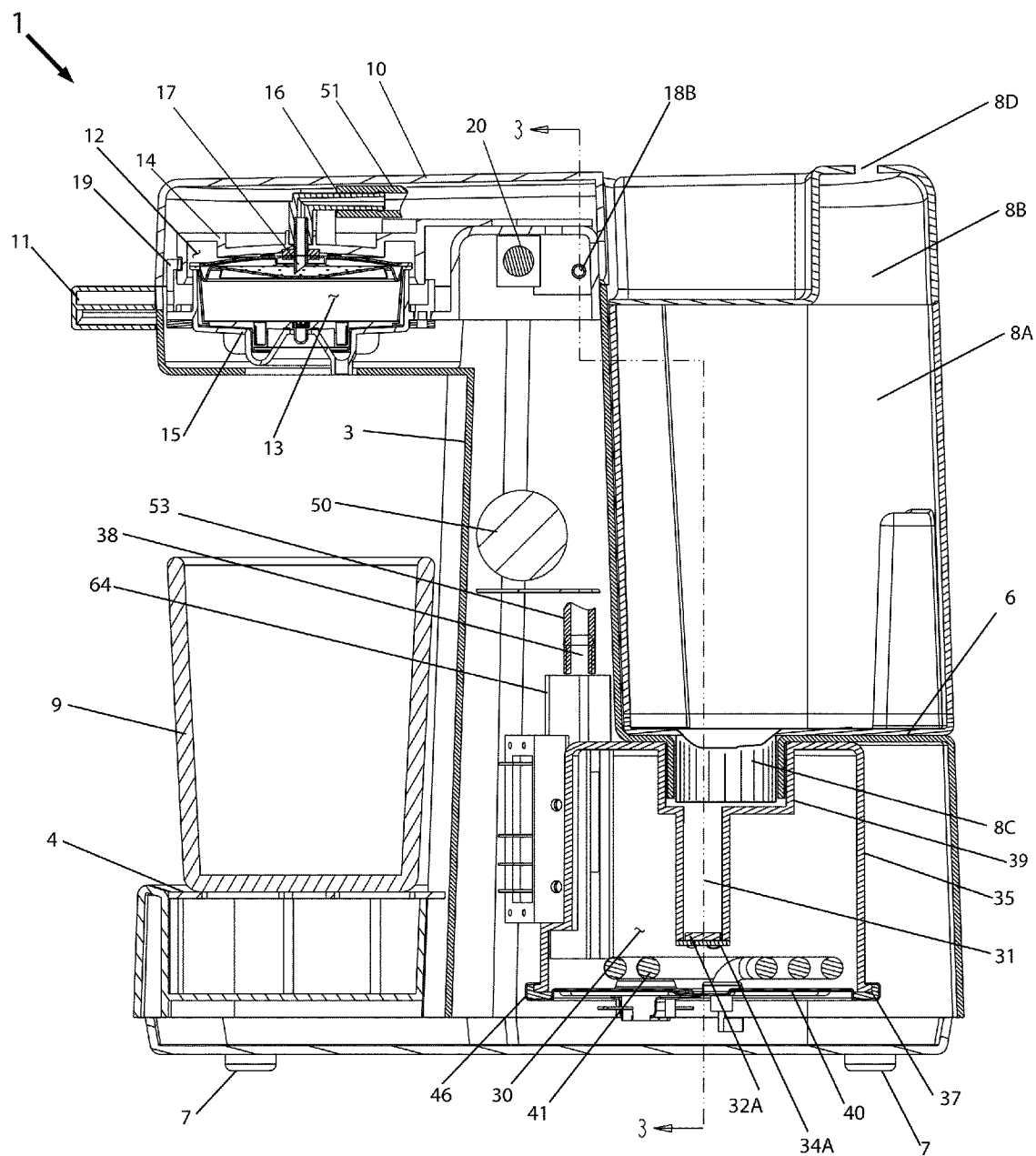
FIG. 2 is a longitudinal cross-sectional view of the coffee brewing apparatus with its lid closed, taken along lines 2-2 of FIG. 1.
Figure 3:
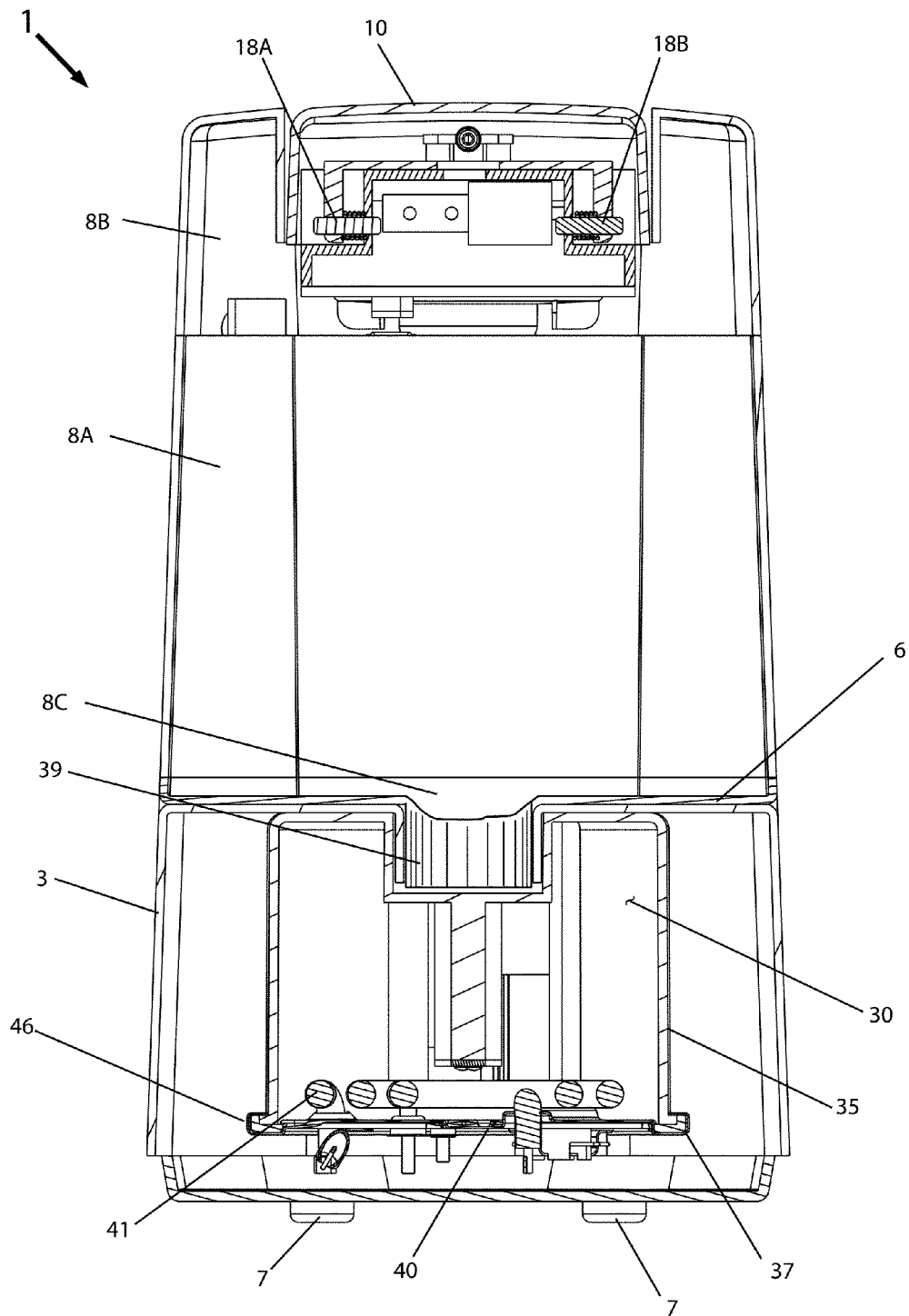
FIG. 3 is a longitudinal cross-sectional view of the coffee brewing apparatus taken along lines 3-3 of FIG. 2.

An exemplary coffee brewer 1 in accordance with and/or for use in practicing to the invention is shown in FIGS. 1 through 3. In particular, enclosure 2 consists of main body 3 embodying platform 4 on which cup 9 is placed so that it is positioned underneath the outlet where the coffee is infused.

On the right front side of the coffee brewer is an array of switches. The top switch 5A is the on-off switch. The other three switches 5B, 5C, and 5D are to be used to select the volume of water that is to be delivered for infusion. Not shown in either of the illustrations is the electric cord providing electric power to the brewer. The main body 3 extends backwards forming a second platform 6 for supporting water tank 8. The water tank consists of a main body 8A and a removable lid 8B, with a vent hole 8D. The water tank 8 can be removed for filling and is provided with a water outlet 8C designed to sealably fit onto a receptacle 39 of a water heater 30 located underneath. The water tank 8 in the present device is made of clear plastic, visualizing the water level in the tank. The water tank may contain 1800 ml of water, typically sufficient to brew up to six cups of coffee.

The main body 3 is hingeably covered by the lid 10, connected to the main body at the lid's distal end through hinge pins 18A and 18B. Underneath the lid there is a latch actuator 11 designed to be activated by the user in order to hold the lid firmly attached to the main body during the brewing process. The coffee brewer is supported on four small rubber feet 7 shown in FIG. 2 and FIG. 3 to prevent it from sliding on the counter.

Figure 4:
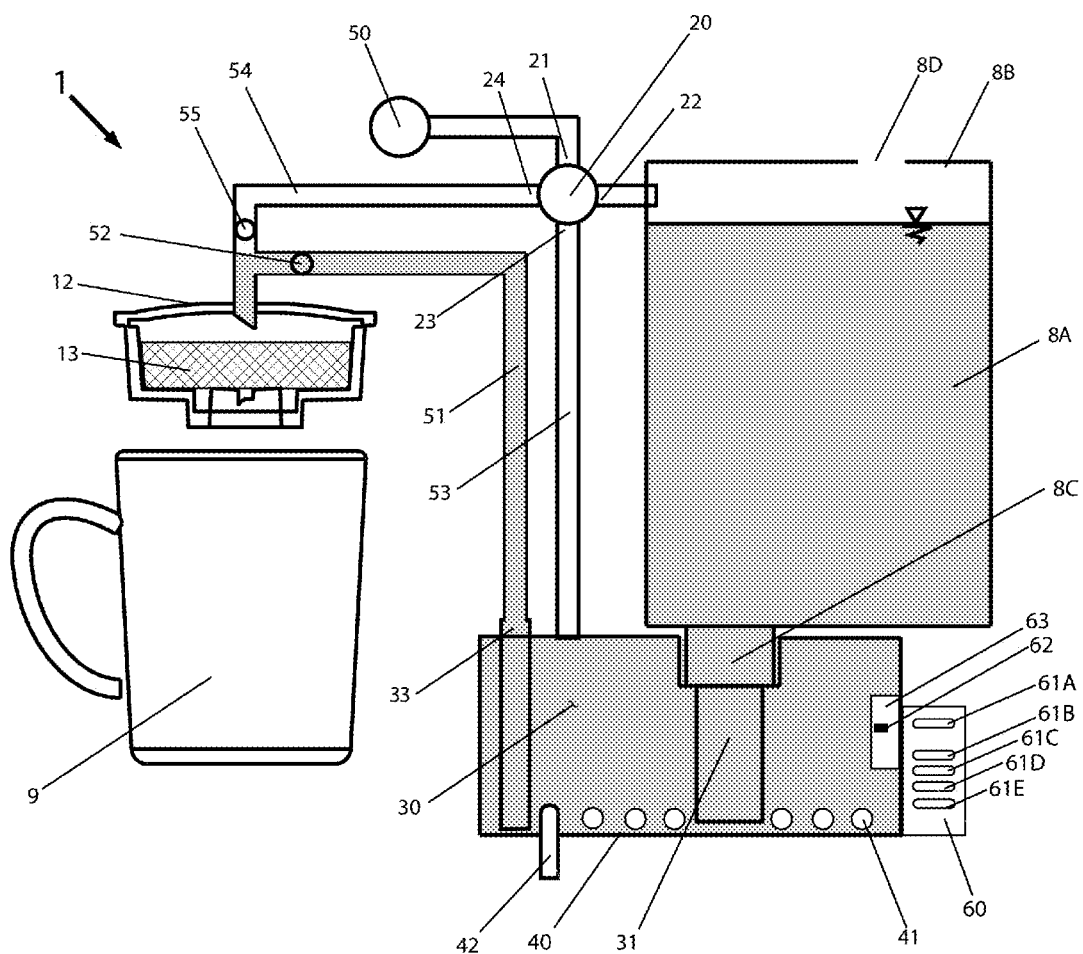
FIG. 4 is a schematic drawing of the coffee brewing apparatus according to the invention.

Reference is now made to FIG. 4, which is a schematic illustration of the exemplary coffee infusion apparatus of FIGS. 1-3. The schematic view shows the water tank 8A with a vented lid 8B, filled with water close to its top, the water tank is seated on the water heater 30 in a leak tight manner, known in the art, the outlet 8C of the tank communicates with a water inlet tube 31, integral to the water heater, with its lower opening proximate the base plate 40 of the water heater, so that water flowing from the tank would enter the water heater near its bottom where electric heating coil 41 is located. This is to ensure that the cold water entering the water heater passes by the electric coil 41 to be heated. A temperature sensor 42 projects into the water heater through the base plate 40 designed to sense the water temperature near the bottom of the water heater. In fact, the temperature sensor 42 is also located near the open end of the water outlet tube to sense the water temperatures as the water exits the water heater and enters the outlet tube during the brewing process. The water outlet tube is connected to a hot water delivery line 51 that includes a check valve 52 leading to the upper half of the brew chamber 12. FIG. 4 also shows an air-line 53 that connects to the top of the water heater, it delivers pressurised air into the water heater to displace the hot water and deliver it into the brew chamber 12 where the infusion takes place. Also shown are an air pump 50 and a four-port valve 20. The four-port valve is connected to the air pump via port 21; to the top the water heater through port 23. It is also connected to an air-line 54 leading to the brew chamber via a check valve through port 24; it is also connected to the atmosphere through port 22.

Reference is next made to FIGS. 6 through 11, which show one embodiment of the water heater 30 according to the invention. The water heater has a water inlet tube 31 designed to deliver cold water to the bottom of the water heater. The lower end of the tube is fitted with a flexible disc 34 made of silicone rubber with its center permanently attached to a cross rib 32 that spans the lower end of the tube. The water head in the tank generates enough force to cause the flexible disc to flex downwards and to permit water to enter the water heater.

When the air pump pressurizes the water heater the flexible disc 34 will be pushed up against the lower end of the tube and seal the water heater, preventing water flowing back into the tank. The water heater 30 also features an air inlet opening 38 through which air is delivered into the water heater to pressurize it and to cause the hot water to exit through the water outlet tube, with its inlet near the bottom of the water heater.

Figure 6:
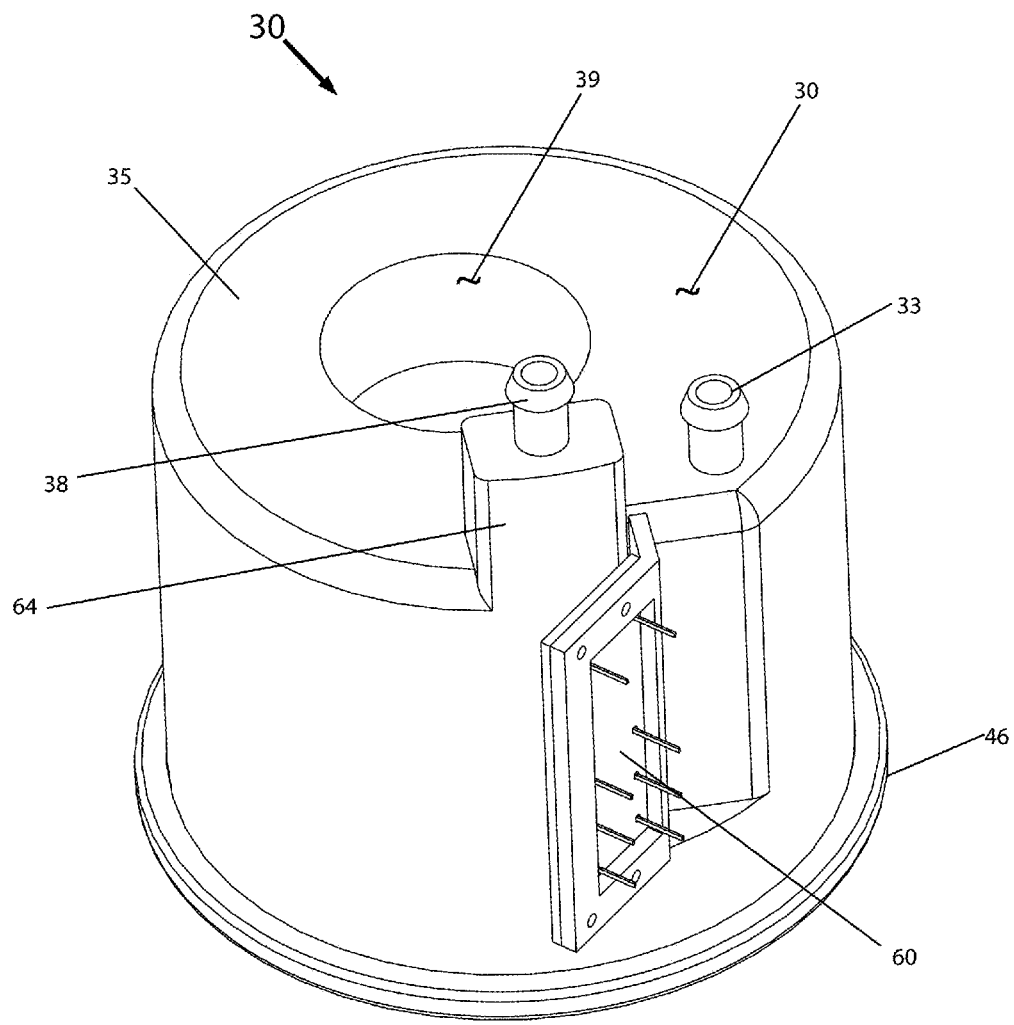
FIG. 6 is an isometric view of a water heater according to the invention.
Figure 7:
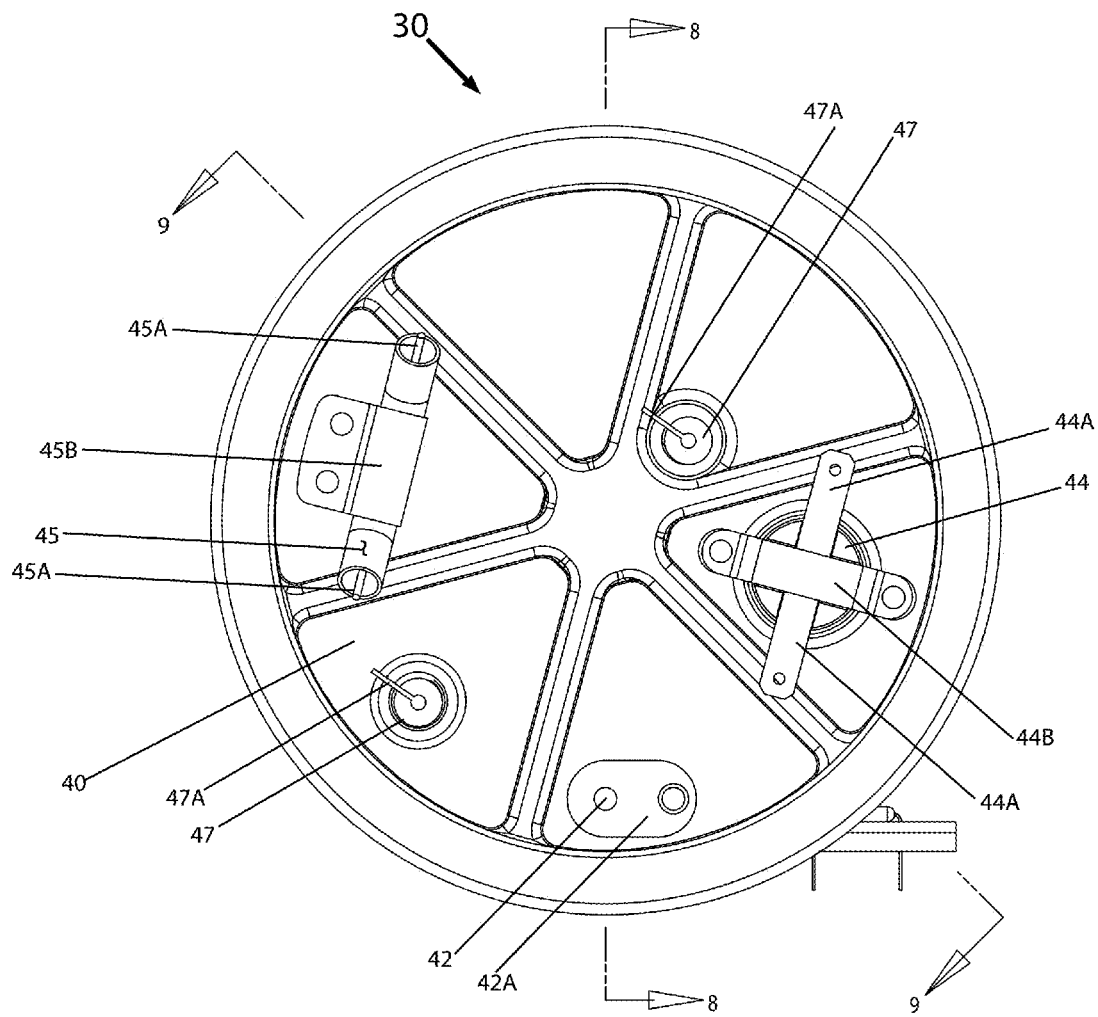
FIG. 7 is a bottom view of the water heater of FIG. 6.
Figure 8:
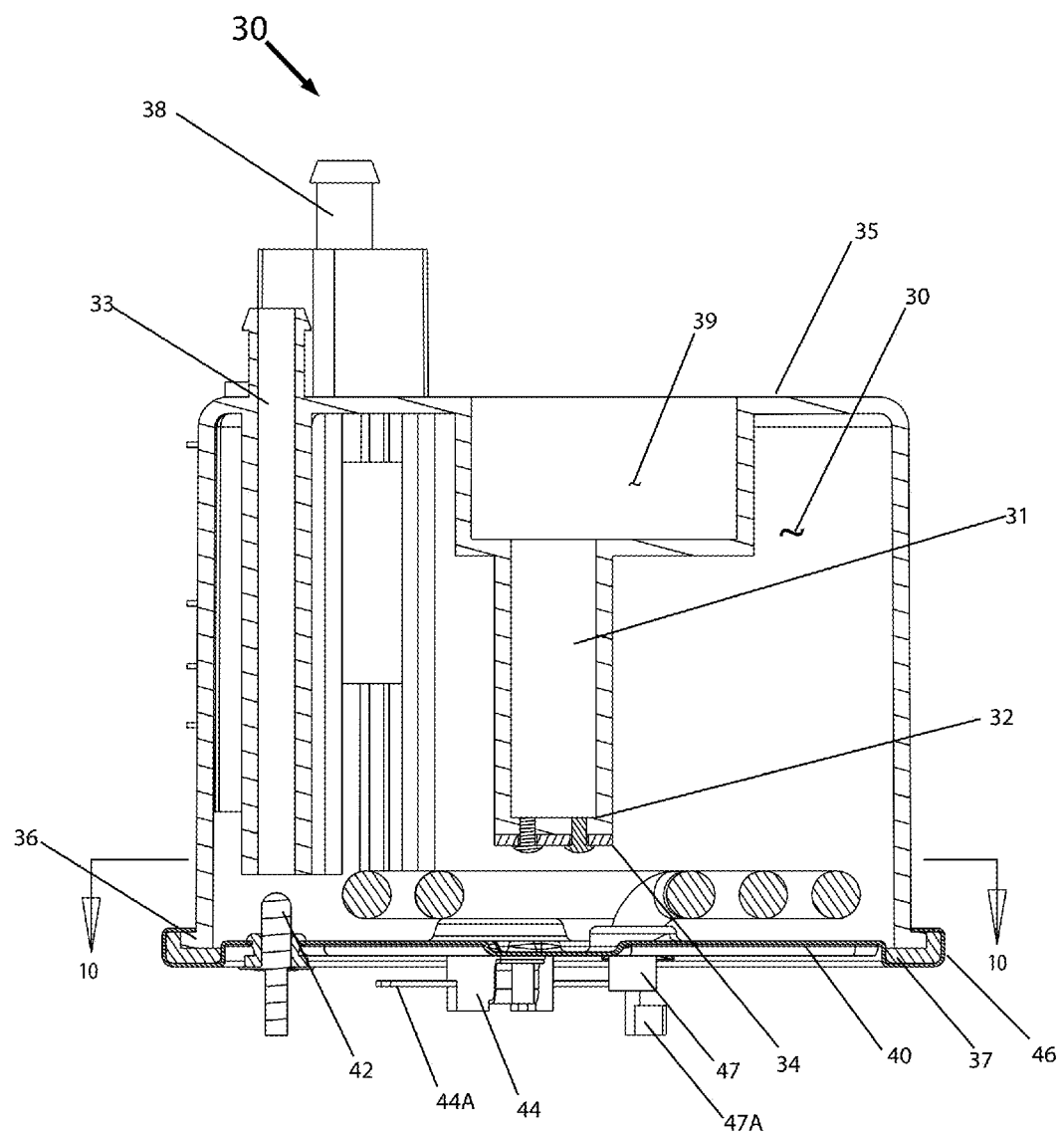
FIG. 8 is a cross sectional view of the water heater taken along lines 8-8 of FIG. 7.
Figure 9:
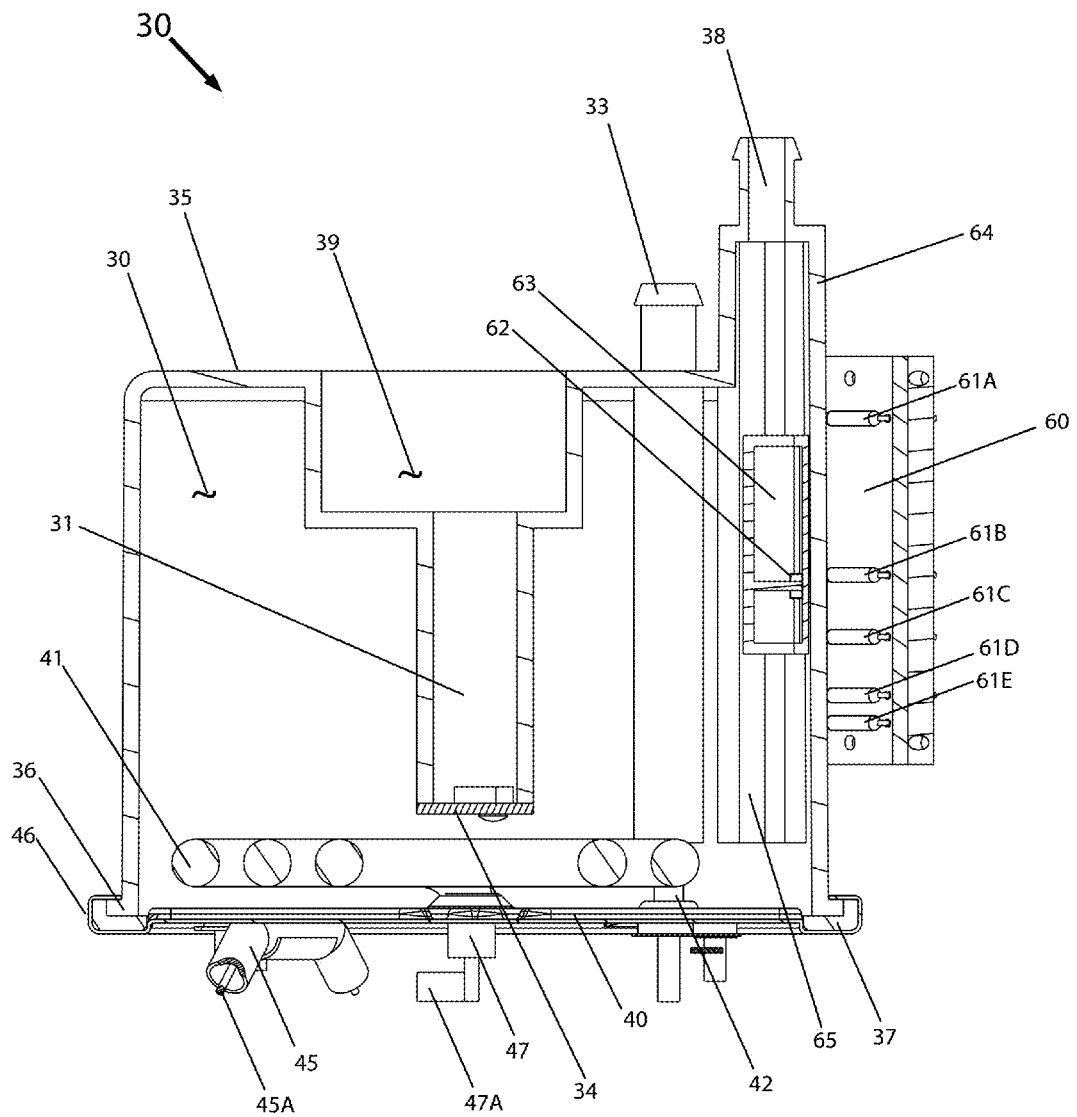
FIG. 9 is a cross sectional view of the water heater taken along lines 9-9 in FIG. 7.
Figure 10:
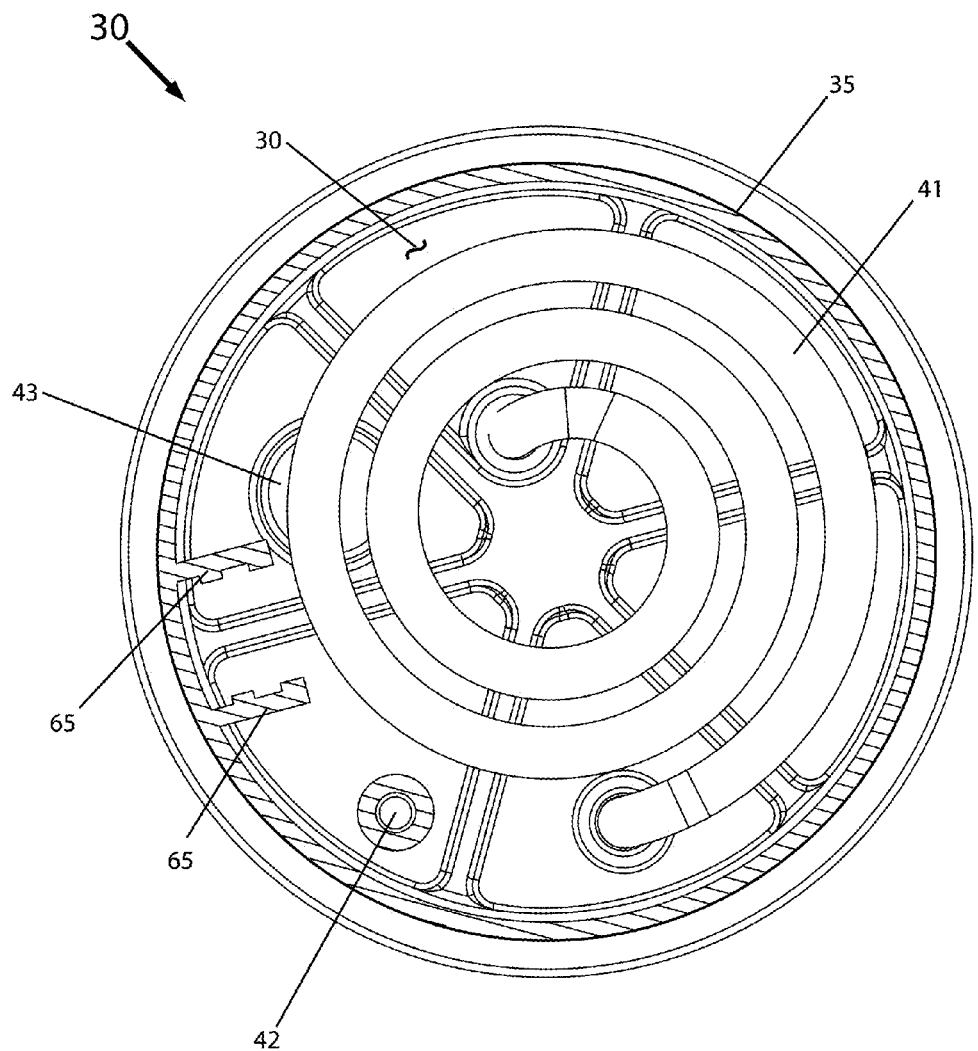
FIG. 10 is a cross sectional view of the water heater taken along the lines 10-10 of FIG. 8.

FIGS. 6 and 9 show that the top of the water heater has a box-like upward projection 64 in line with the movement of the float, that projection with the air inlet 38 terminating at its upper face permits the float to rise to a level where the magnet is approximately in line with the top of the water heater and will trigger the upper most reed switch 61A, which is used to indicate that the water heater is full. If it is not, then the user will be prompted to fill the water tank so that water will flow into and fill the water heater.

The second reed switch 61B is located, for example, at 50% of the height of the water heater; the third reed switch 61C at 40% of the height of the water heater; the fourth reed switch 61D is located at 30% of the height of the water heater, therefore as the float 63 containing the magnet 62 descends as the water in the water heater is displace by air each of the three switches 61 will signal to the control circuit that the magnet 62 passes by.

Assuming that the total volume of the water heater is 10 ounces then the second switch will signal when 5 ounces were delivered, the third when 6 ounces were delivered and the fourth when 7 ounces were delivered. The control circuit (not shown) will stop the pump and the resultant delivery of water to the brew chamber when the magnet reaches the reed switch that corresponds with the volume chosen by the user by having pushed one of the switches 5B, 5C or 5D.

Base plate 40 is formed from a sheet of stainless steel supporting a stainless steel sheathed coil shaped electric heating element 41, which is positioned proximate the plate and immersed in the water. The heating element terminals 47 project downwards of the plate and fixed to the plate in a leak-proof manner, such as brazing or other techniques known in the art. A temperature sensing probe 42 penetrates the plate in a sealed manner, with its sensing portion in the water and its electric leads (not shown) outside the water heater. The probe is used to sense the water temperature and to send a signal to a control circuit when to turn the heater on and off in response to the temperature of the water. The plate includes an upwardly projecting truncated cone 43 to which a section of the heating coil is attached in a thermally conductive manner for a thermostat 44 with its electrical terminals 44A to turn the heater off in the event that there is no water in the tank to absorb the heat from the heater. The thermostat 44 is firmly held in place by bracket 44C. Also shown is a second thermal protector 45 with its terminals 45A attached to the plate by bracket 45C. The thermal protector will permanently shut off the power to the heater in case the thermostat did not respond.

The upper portion of the water heater 35 is an inverted cup molded from a plastic resin designed to withstand the pressure and the temperature associated with the operation of the water heater. Such plastic material is typically reinforced with glass fibers to attain the properties needed in such application. One such material is Glass Filled Nylon, Lanxess Durethan BKV30 which has been approved by FDA for food contact.

The upper portion of the water heater 35 and the base plate 40 establish the leak tight volume of the water heater. They can be joined together for example by folding the outer edge 46 of the stainless steel plate over a flange 36 extending outwards from the bottom of the circumferential vertical wall of the upper part. A circular silicone seal 37 with an "L" shaped cross section can be used to provide a leak tight seal that withstands the temperature and pressure during the brewing process.

Figure 13:
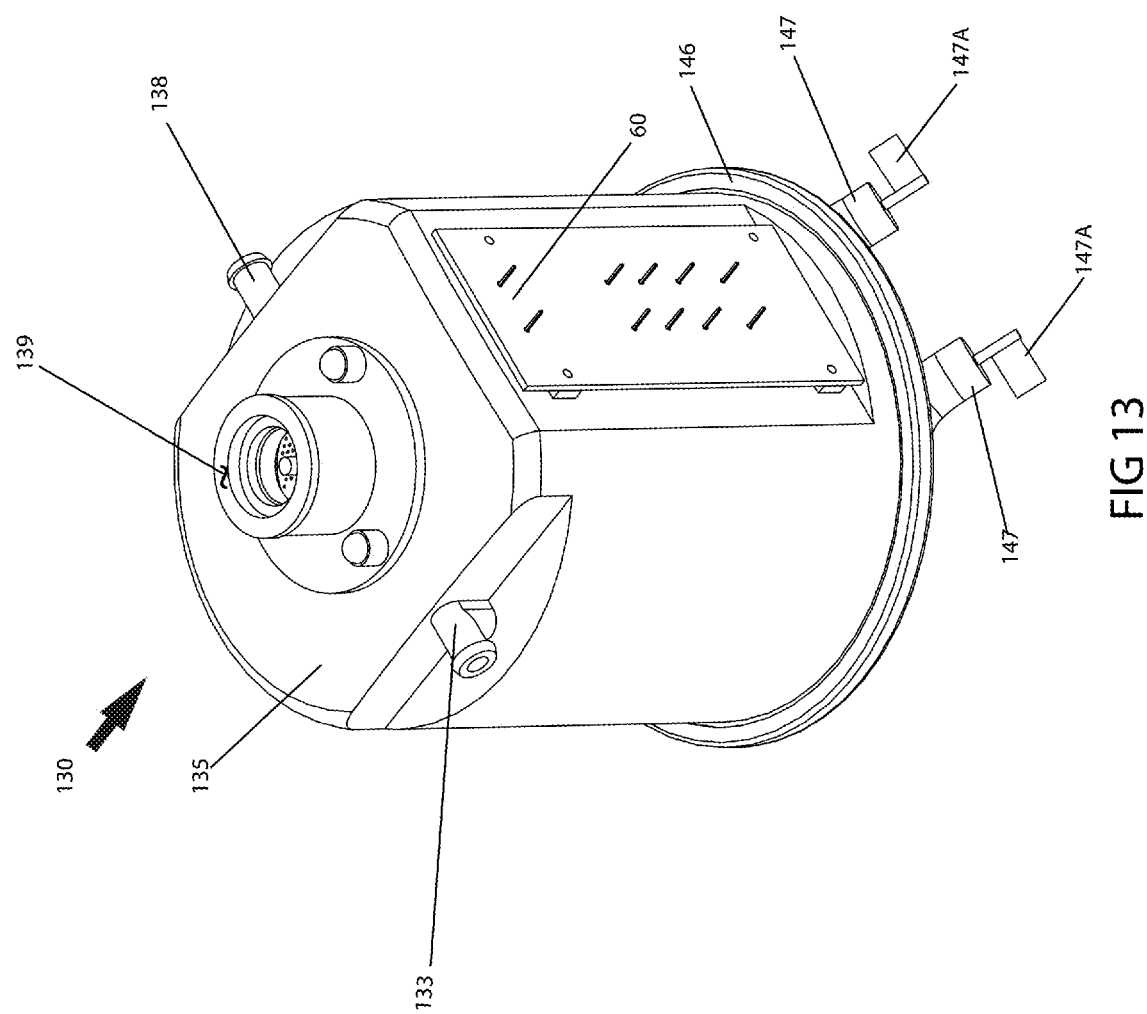
FIG. 13 is an isometric view of a water heater of an alternate construction according to the invention.
Figure 14:
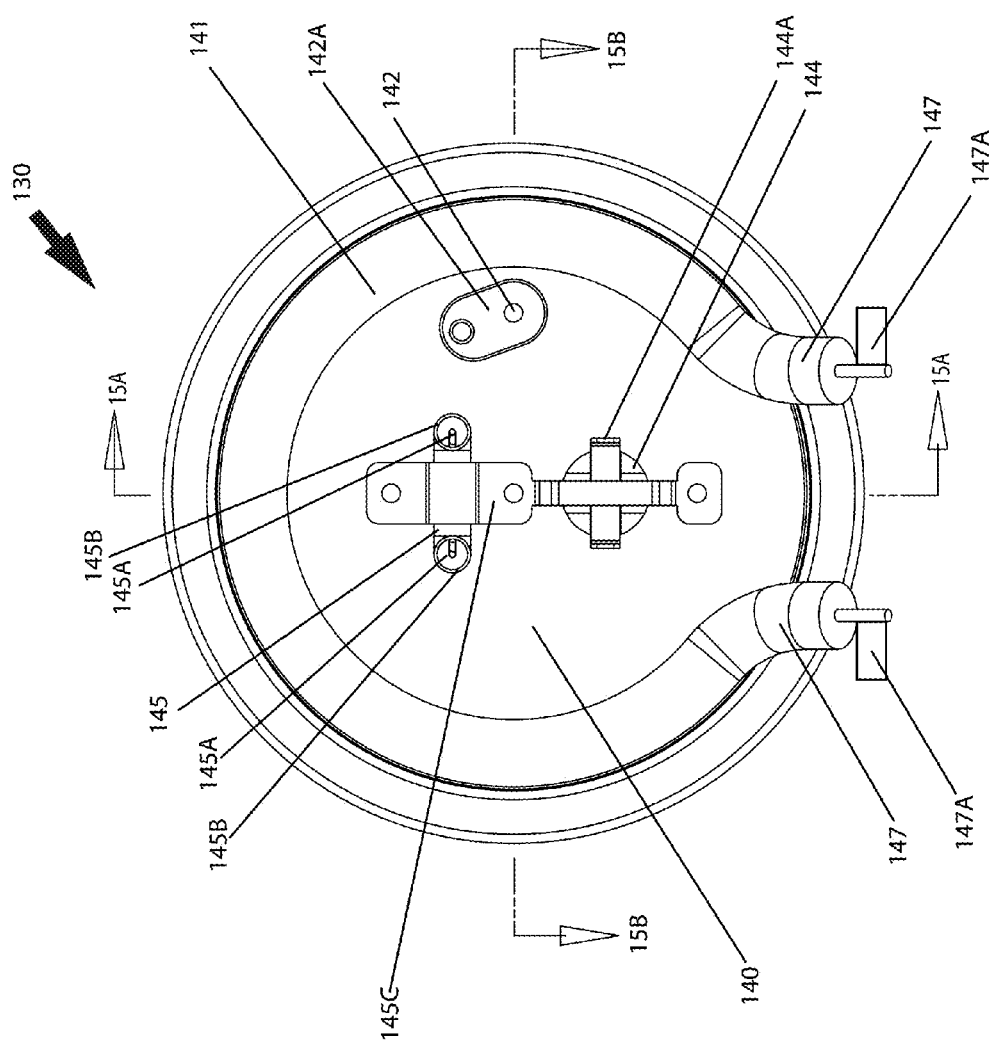
FIG. 14 is a bottom view of the water heater of FIG. 13.

Reference is next made to FIG. 13, FIG. 14 and FIGS. 15A and B, which show another embodiment of the water heater 130. The water heater has a water inlet tube 131 designed to deliver cold water to the bottom of the water heater. The upper end of the tube is provided with a check valve known in the art, which is normally open to permit water to flow from the tank 8 into the water heater 130. When the water heater is pressurized the check valve will seat to prevent water from flowing back into the tank 8. The water heater 130 also features an air inlet opening 138 through which air is delivered into the water heater to pressurize it and to cause the hot water to exit through the water outlet tube 133, with its inlet near the bottom of the water heater. Also shown in FIG. 16 is the heater 141A that is permanently attached to the base plate 140, in a manner known in the art that ensures efficient heat transfer into the water.

Reference is next made to FIGS. 14, 15A and 15B, which illustrate and address the alternate design of the base plate 140, which is formed from a sheet of stainless steel with the heating element 141A attached to it by a brazing process. A temperature sensing probe 142 penetrates the plate in a sealed manner, with its sensing portion in the water and its electric leads (not shown) outside the water heater. The probe is used to sense the water temperature and to send a signal to a control circuit when to turn the heater on and off in response to the temperature of the water. A thermostat 144 with electrical terminals 144A is attached to the base plate by a bracket 144C to turn the heater off in the event that there is no water in the tank to absorb the heat from the heater. Also shown is a second thermal protector 145 attached to the plate as described in reference to the first embodiment.

FIGS. 13, 15A and 15B also illustrate the upper portion of the water heater 135A which is similar to the 35A, except for changes in design such as the connection to the water tank projecting upwardly, and the water discharge tube and the air entry tube being at right angle to the axis of the water heater. The upper portion of the water heater 135A and the base plate 140 are joined together to establish the leak tight volume of the water heater in the same manner as in the first embodiment of the water heater.

Figure 12:
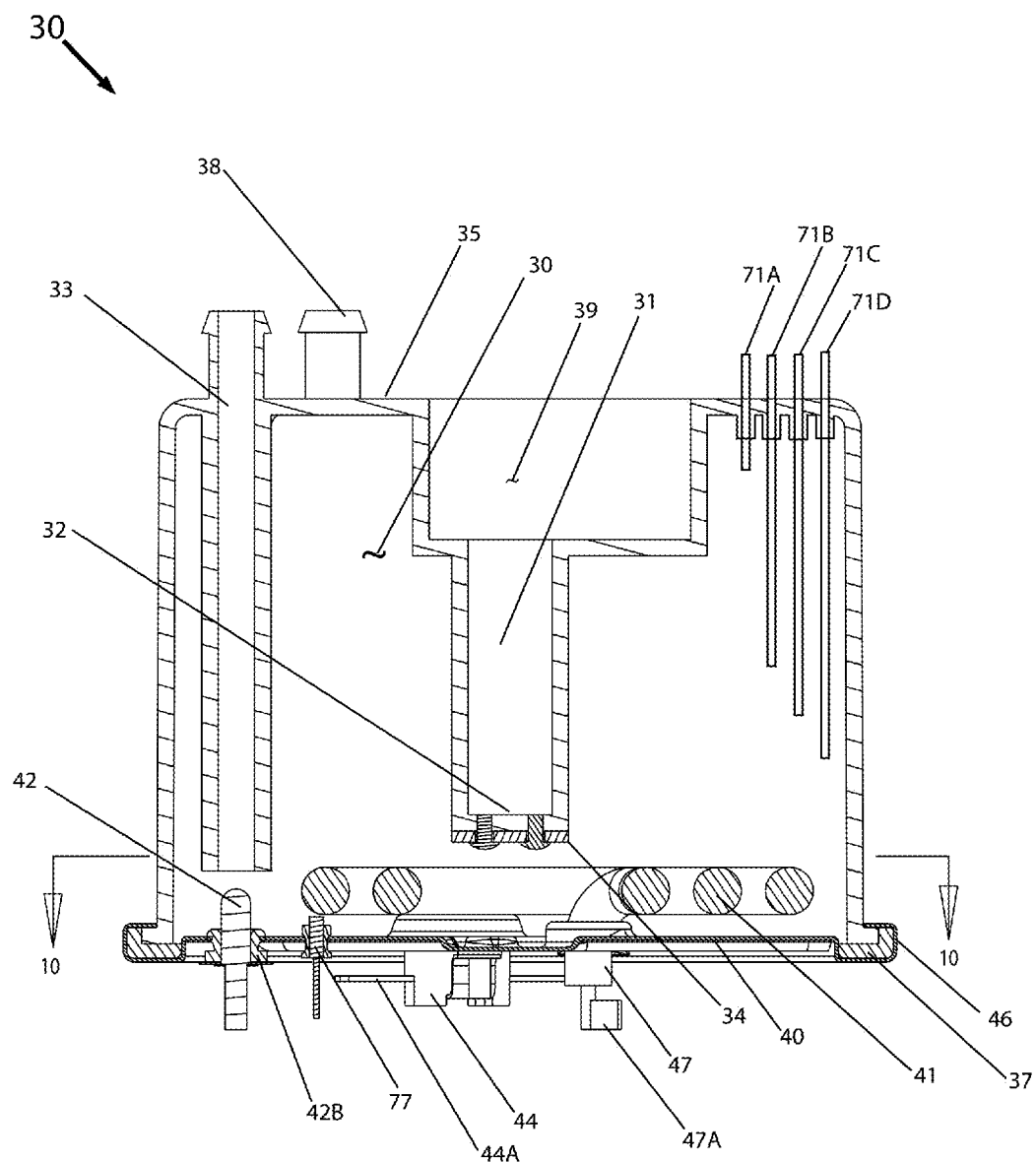
FIG. 12 is a cross sectional view of another water heater according to the invention.

FIG. 12 shows still another embodiment of the water heater 30 where there are four metallic rods 171A, 171B, 171C, and 171D protruding into the water from the top of the water heater, the purpose of the rods is to sense an electrical continuity through the water between the tip of each rod and an electric terminal 77 protruding through the base plate 40 of the water heater. The tip of the shortest rod 171A is covered with water when the water heater is full. If it is not, then the user will be prompted to fill the water tank so that water will flow into the water heater. The tip of second rod 171B is located, for example, at 50% of the height of the water heater; the tip of the third rod 171C at 40% of the height of the water heater; the tip of the fourth rod 171D is located at 30% of the height of the water heater, therefore as water in the water heater is displace by air each of the three rods 171B, 171C, and 171D will signal to the control circuit that a corresponding water level has been reached. Assuming that the total volume of the water heater is 10 ounces then the second rod will signal when 5 ounces were delivered, the third when 6 ounces were delivered and the fourth when 7 ounces were delivered.

FIG. 2 also shows the brew chamber 12, in a closed position, with a capsule 13 enclosed in the brew chamber. The brew chamber 12 consists of an upper half 14 and a lower half 15. The lower half 15 of the brew chamber is designed to receive an infusible material capsule 13 of a specific shape and size. The upper half 14 of the brew chamber shows a right-angle water conduit 16 that terminates in a sharp pin 17 designed to penetrate the capsule when the brew chamber is closed to create a closed environment in which the infusible material is infused by the hot water to produce a beverage that is delivered into the cup 9 underneath the capsule outlet. This feature is described in detail in U.S. Pat. No. 8,518,204 and will not be discussed here.

Flexible hot water line 51 designed to withstand the temperature and pressure of water needed for the infusion process connects the water heater water outlet tube (not shown) to the right angle water conduit 16 of the brew chamber.

FIG. 2 also shows a latch 19 used to hold the brew chamber tightly shut. The latch is of a type known in the art as a bayonet latch. The latching is accomplished by the user pushing down the lid 10 containing the upper half of the brew chamber 14 till it abuts against the lower part of the brew chamber 15. The user then slides the latch actuator 11 projecting outside the housing causing the lower half of the brew chamber 14 to turn clockwise to engage the two halves of the bayonet latch thus locking the brew chamber tightly.

Also indicated in FIG. 2 is an air pump 50, the air pump chosen for this application is made by Shenzhen Skoocom and the pump found most suitable for the application was Model SC3707PM. The air pump 50 is characterized by its silent operation and steep pressure characteristics, which is important to the design, as it will ensure a repeatable air delivery rate when there is a variation in the back pressure from one use to the other. Of course, any number of alternative air pumps may be substituted with varying degrees or acceptability. The invention is not in any way to be limited to the use of the preferred Shenzhen Skoocom pump.

Figure 5A:
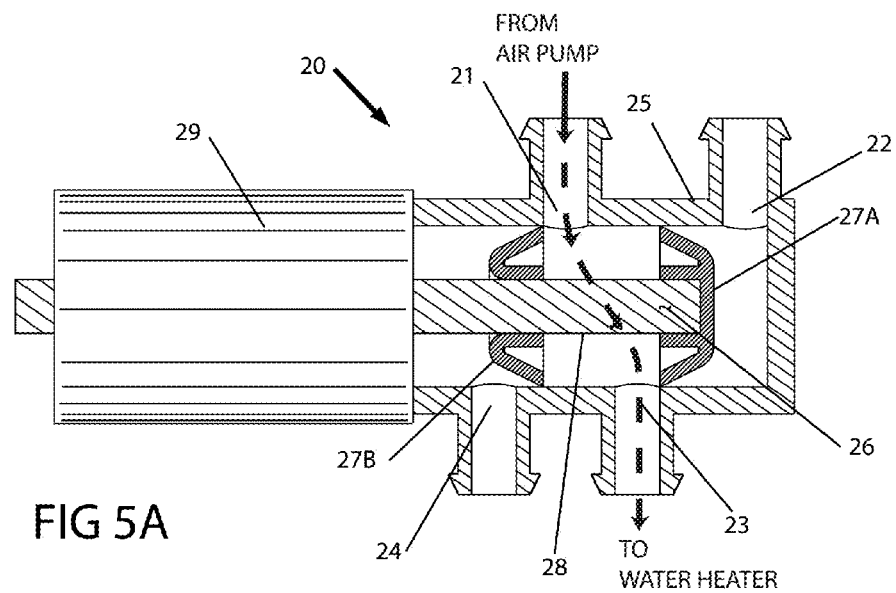
FIG. 5A is schematic drawing of an air valve incorporated in the coffee brewing apparatus according to the invention, the air valve is shown in a first of two positions.
Figure 5B:
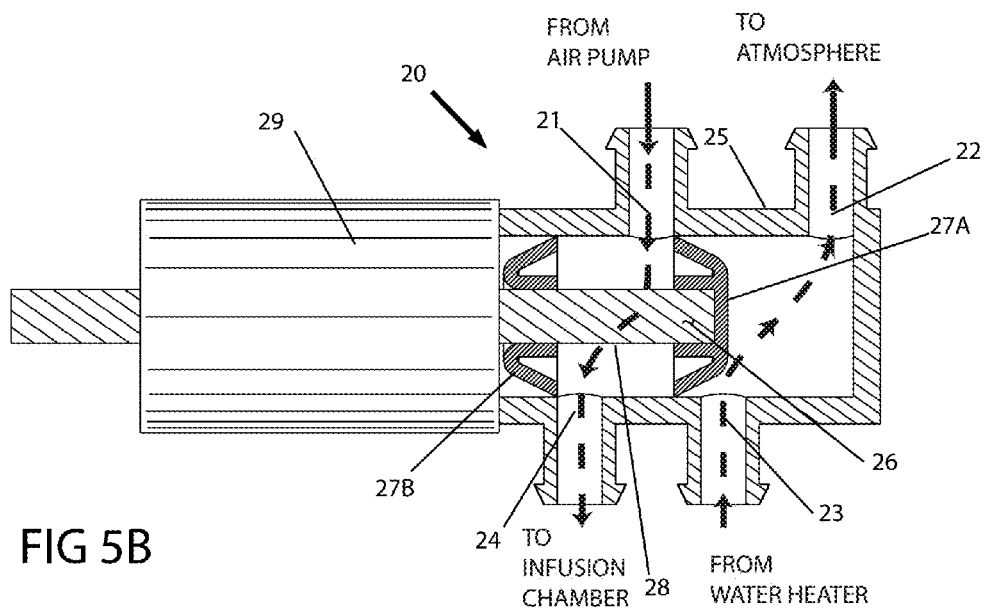
FIG. 5B is schematic drawing of an air valve incorporated in coffee brewing apparatus according to the invention, the air valve is shown in a second of two positions.

FIGS. 5A and 5B illustrate an air valve for use in the apparatus according to the invention. In FIG. 5A the valve 20 is shown in its energized position, whereas in FIG. 5B the air valve is shown in its non-energized positions, also referred to as the default position. The air valve consists of a cylindrical body 25 with four ports; port 21 is connected to the air pump, port 22 is connected to atmosphere, port 23 is connected to the top of the water heater, and port 24 is connected to the brew chamber. Each of these ports may have a barbed end designed to accept and retain a flexible tube. Inside the cylindrical body 25 is a movable piston 26 comprising two flexible cylindrical seals 27A and 27B, firmly attached to a piston rod 28 made of magnetic steel that extends through an electromagnetic coil (referred to as "solenoid") 29 in a manner known in the art. When the solenoid is energized the electro-magnetic field will push the piston rod including the seals from the position of FIG. 5B to the position of FIG. 5A so that port 21 will communicate with port 23, meaning that pressurised air form the air pump will flow into the water heater and will dispense hot water out of the water heater and into the brew chamber, while ports 22 and 24 remain shut.

When the solenoid is not energized, a spring inside the solenoid (not shown) holds the piston rod 28 and the seals 27A and 27B in the position of FIG. 5B to cause port 21 to communicate with port 24 allowing pressurised air to flow into the brew chamber and flush out any remaining water. At the same time port 22 will communicate with port 23, opening the water heater to atmosphere and allowing water to flow from the tank into the water heater.

Figure 5C:
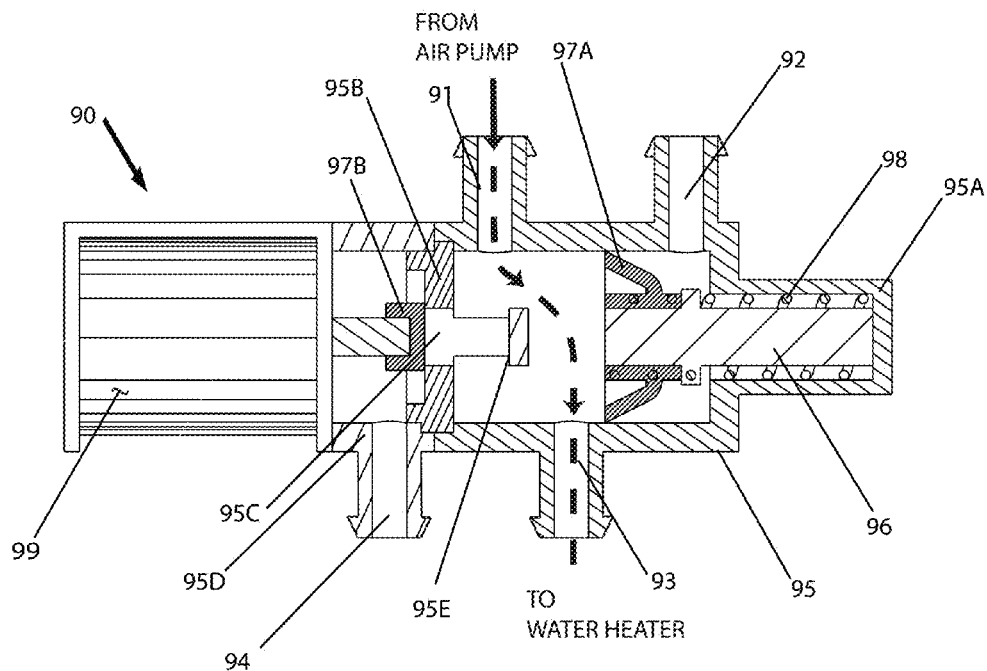
FIG. 5C is schematic drawing of an alternate air valve incorporated in the coffee brewing apparatus according to the invention, the air valve is shown in a first of two positions.
Figure 5D:
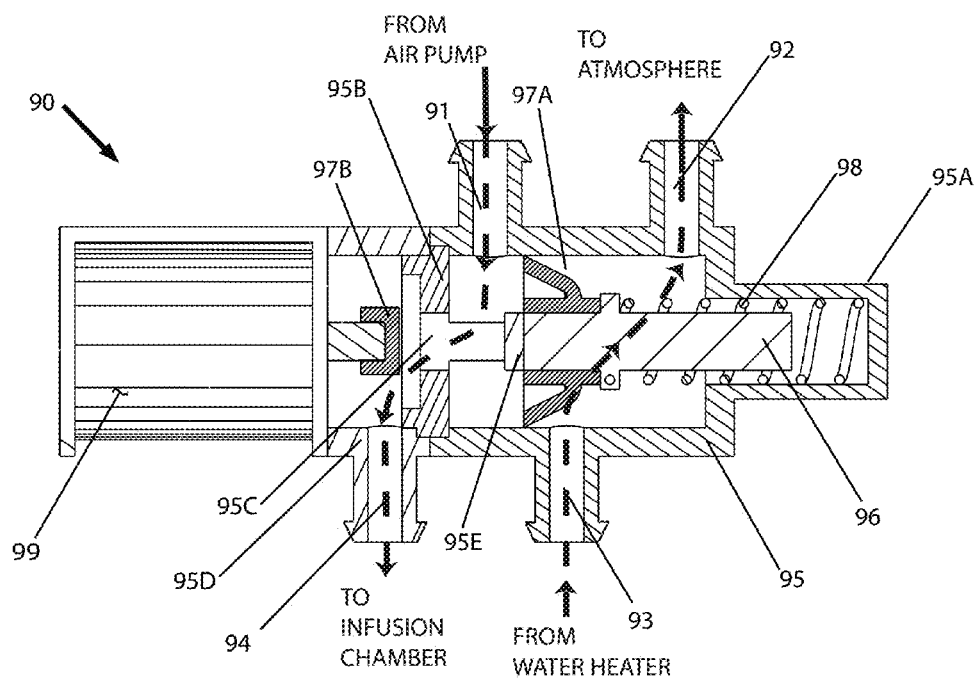
FIG. 5D is schematic drawing of an alternate air valve incorporated in coffee brewing apparatus according to the invention, the air valve is shown in a second of two positions.

FIGS. 5C and 5D illustrate an alternative air valve for use in the apparatus according to the invention. In FIG. 5C the valve 90 is shown in one position, whereas in FIG. 5D the air valve is shown in a second position. The air valve consists of a closed cylindrical body 95 with four ports, 91, 92, 93, and 94 (corresponding to the ports 21, 22, 23, and 24 of the valve mentioned above). Each is designed to connect to flexible tubing. A divider 95B with a small aperture 95C and a spring well 95A are also an integral part of the closed cylindrical body of the valve. Inside the cylindrical body 95 is a flexible seal 97A, firmly attached to a rod 96 in a manner known in the art, surrounded by a helical spring 98, which is shown in its compressed position in FIG. 5C and in its extended position in FIG. 5D. A solenoid 99 activates a seal 97B which in its non-energized position causes the aperture 95C to be sealed and which in its energized position opens aperture 95C. The divider 95B features a bracket 95E intended to stop the movement of the seal 97A beyond a set point.

Referring to FIG. 5C, when the aperture 95C is closed and the air pump is turned on air under pressure will enter through port 91, and the seal 97A will be pushed by the air pressure and will compress the spring 98 until port 93 is exposed and the pressurised air from the air pump will flow through the valve and into the water heater to displace water from the water heater into the brew chamber. When the controller determines that the required volume of water was delivered it will cause the air pump to stop and the port 95C will be opened by the solenoid 99 being energized. The spring 98 will push the seal 97A to the position of FIG. 5D, thereby connecting port 92 to port 93, opening the water heater to atmosphere and allowing water to flow from the fresh water tank into the water heater. The air pump will now be energized for 2-3 seconds and pressurized air will flow from the air pump through port 91, and through port 94 into the brew chamber to push out any residual water; even though the air pump is reenergized the seal 97A will not overcome the bias of the spring because the air pressure during that period is very low. Because of the short movement of the solenoid coil and the short time (2-3 seconds) that the coil is activated, a weaker and less expensive solenoid can be used than in the valve previously described.

Figure 5E:
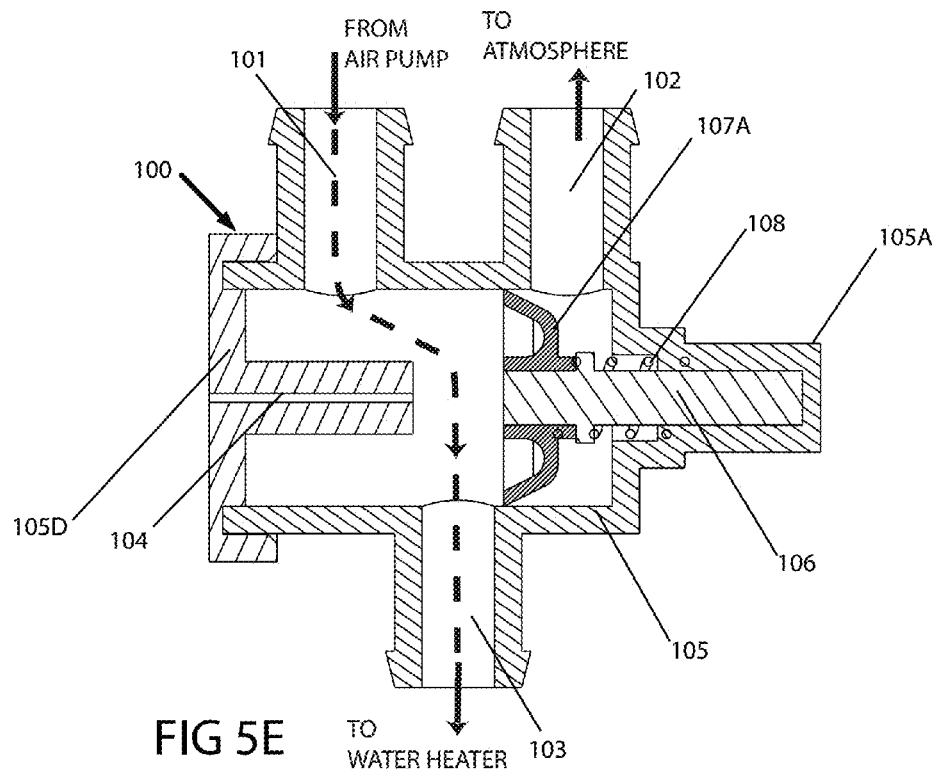
FIG. 5E is schematic drawing of an alternate air valve incorporated in the coffee brewing apparatus according to the invention, the air valve is shown in a first of two positions.
Figure 5F:
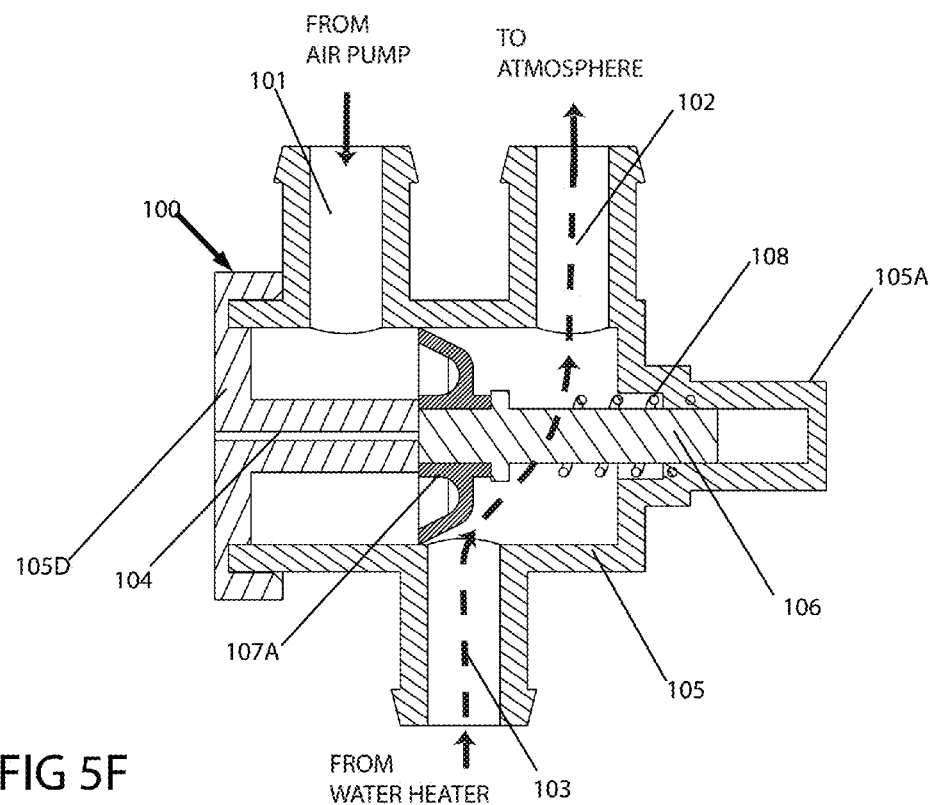
FIG. 5F is schematic drawing of an alternate air valve incorporated in coffee brewing apparatus according to the invention, the air valve is shown in a second of two positions.

FIGS. 5E and 5F illustrate a third air valve for use in the apparatus according to the invention. In FIG. 5E the valve 100 is shown in one position, whereas in FIG. 5F the air valve is shown in a second position. The valve is characterized as being self-actuated by the air pressure generated by the air pump 30. The air valve consists of a closed cylindrical body 105 with three ports, 101, 102, and 103 (corresponding to the ports 21, 22, and 23 of the first valve mentioned above). Each is designed to connect to flexible tubing. Cap 105D includes an inwardly projecting stem intended to stop the movement of the seal 107A beyond a set point. The stem has a very small vent 104. The cap and spring well 105A are also integral parts of the closed cylindrical body of the valve. Inside the cylindrical body 105 is a flexible seal 107A, firmly attached to a rod 108 in a manner know in the art, surrounded by a helical spring 106, which is shown in its compressed position in FIG. 5E and in its extended position in FIG. 5F.

Referring to FIG. 5E, when the air pump is turned on air under pressure will enter through port 101, and the seal 107A will be pushed by the air pressure and will compress the spring 106 until port 103 is exposed and the pressurised air from the air pump will flow through the valve and into the water heater to displace water from the water heater into the brew chamber, while some air will escape through vent 104, the air pump will still generate sufficient pressure to push the seal against the bias of the spring 108. When the controller determines that the required volume of water was delivered it will cause the air pump to stop. The spring 108 will push the seal 107 to the position of FIG. 5F, as the air will escape through vent port 104, thereby connecting port 102 to port 103, opening the water heater to atmosphere and allowing water to flow from the tank in to the water heater. This valve will not provide for the moisture flushing of the brew chamber as was achieved by the other two embodiments of the valve, but it does not require any electro-mechanical device and any electrical connections as in those embodiments.

To start the operation of the coffee brewer the user presses the on-off switch 5A once. If the upper reed switch does not sense the presence of the magnet in the float the red light will flash rapidly. It is an indication that there is not enough water in the system and the user will have to fill the water tank. Once the tank is filled the red light (not shown) will start flashing slowly, as the sensor in the water heater waits for the water to heat up. When the water in the water heater reached the pre-infusion temperature the light will stop flashing, signaling that the brewer is ready. The "pre-infusion" temperature can be selected by the designer of the brewer, for energy saving considerations or for time saving consideration, as shall be explained below. The user then opens the lid 10 by turning the latch actuator 11 in a counter clockwise direction and places an infusible material capsule 13 into the lower half of the brew chamber 15, and then lowers the lid 10 and locks the chamber. This may push the sharp pin of the water conduit to cause penetrate the capsule through the top seal, and may also push the whole capsule down and causing the lower seal to rupture, as described in U.S. Pat. No. 8,180,204. Alternately the user may place a soft pod or lose ground coffee in the brew chamber according to the design of the brew chamber.

The presence of a capsule 13 in the brew chamber may be detected by a safety switch (not shown) allowing the infusion process to commence. The user may now place a receptacle of the appropriate size on the platform 4 underneath the capsule outlet, to receive the finished hot beverage.

Next the user may select the volume of hot water to be dispensed into the brew chamber. FIG. 1 shows three switches 5B, 5C, and 5D, corresponding to given water volumes (referred to as "small" "medium" and "large"). By activating one of the switches the circuit will be commanded to switch the reference temperature-setting to the "infusion" temperature (preferably 92 C). After that is achieved, the air pump 50 will deliver pressurized air through the air valve, through the air line 53 to the top of the water heater thereby causing the water to flow out of the water heater through the water outlet tube (not shown), with its opening proximate the base of the water heater and the heating coil. The temperature sensor 42 will continuously control the electric heater 41 to maintain the temperature of the water flowing into the water delivery tube at the set value of the infusion temperature. As water is delivered to the brew chamber the water level in the tank sinks, as does the float 63 with the magnet 62. As the float passes by each reed switch 61 it activates it, and a signal is relayed to the control circuit (not shown).

When the control circuit recognizes that the water volume corresponding to the selected volume has been delivered, the control circuit will simultaneously reset the temperature of the sensor to the "pre-infusion" value and will turn off the power to the air valve 20, causing it to switch to its default position, thereby connecting the pump port 21 to port 24 that is connected to the brew chamber through air-line 54 and check valve 55. That air flow, lasting about 2-3 seconds, will push any access water out of the capsule 13 so it stays dry. In the default position of the valve, it connects port 23 to port 22, thereby the top of the water heater will open to atmosphere, allowing the unimpeded flow of water from the water tank into the water heater. As cold water flows into the water heater the sensor 42 will energize the electric heating coil to heat the water until the "pre-infusion" temperature is reached. The brewer 1 is now ready to go through the same cycle again.

Figure 11:
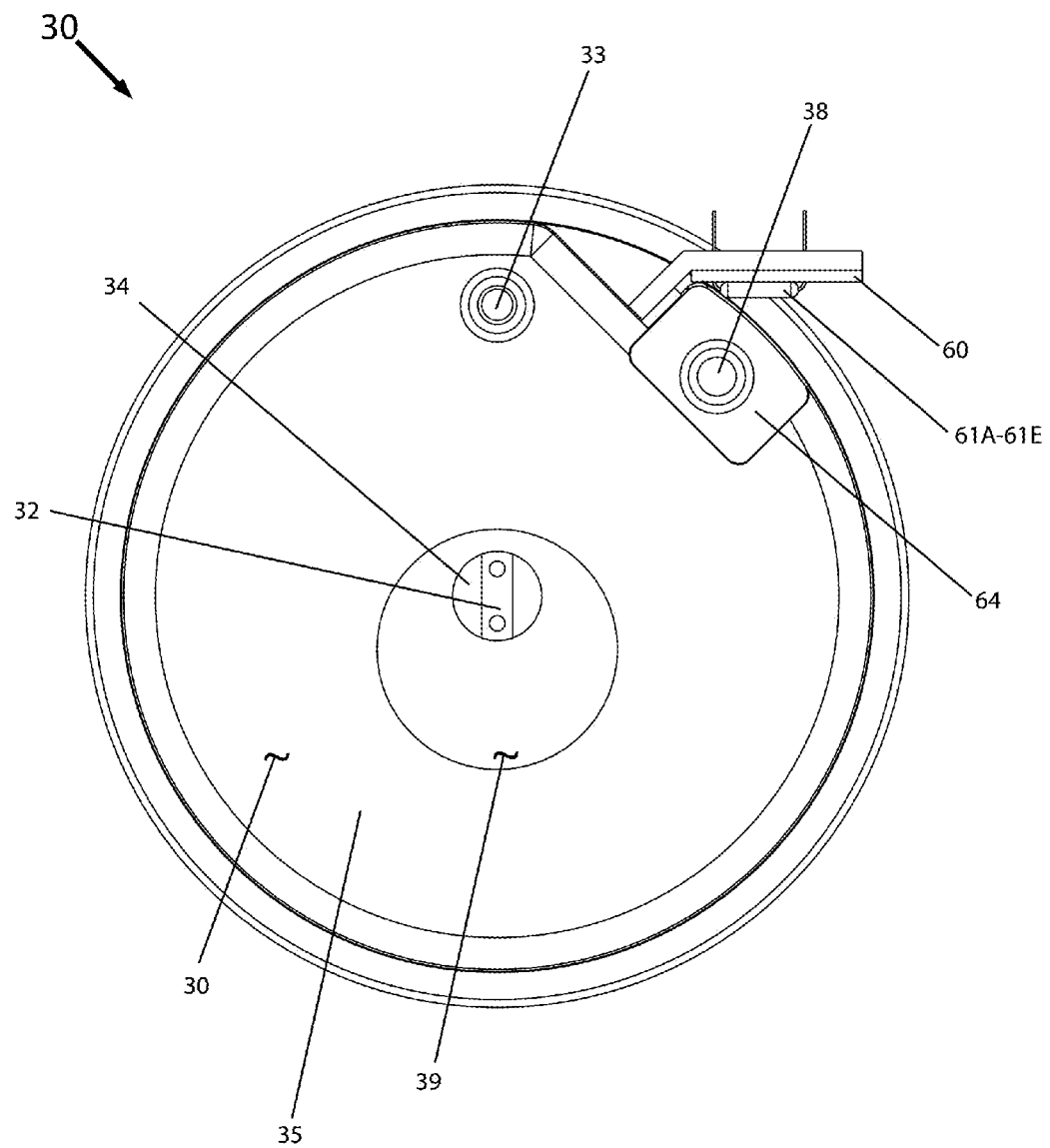
FIG. 11 is a top view of the water heater of FIG. 6.
Figure 15:
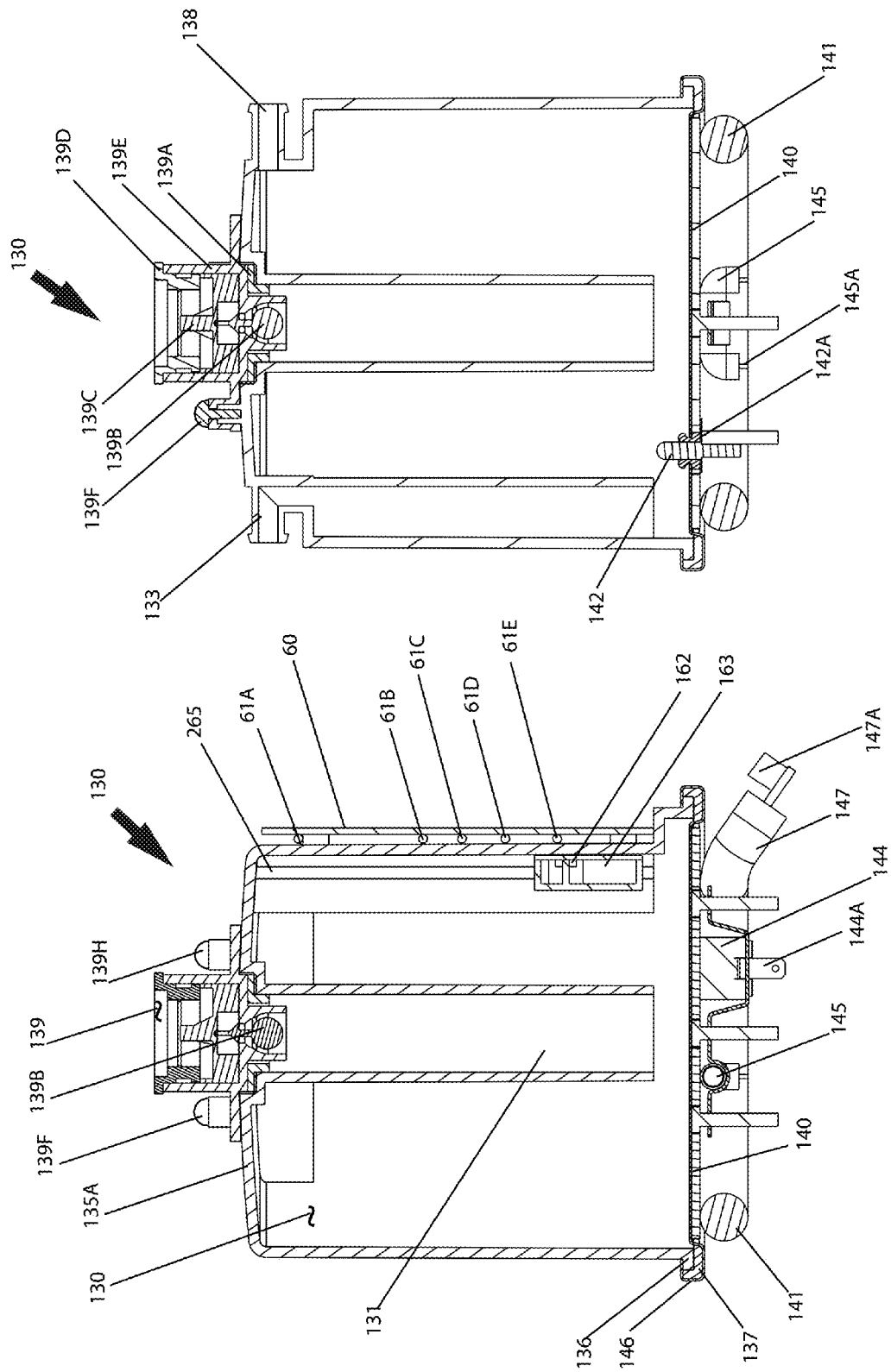
FIG. 15A is another cross sectional view taken along lines 15A-15A of FIG. 14.
FIG. 15B is another cross sectional view taken along lines 15B-15B of FIG. 14.
Figure 16:
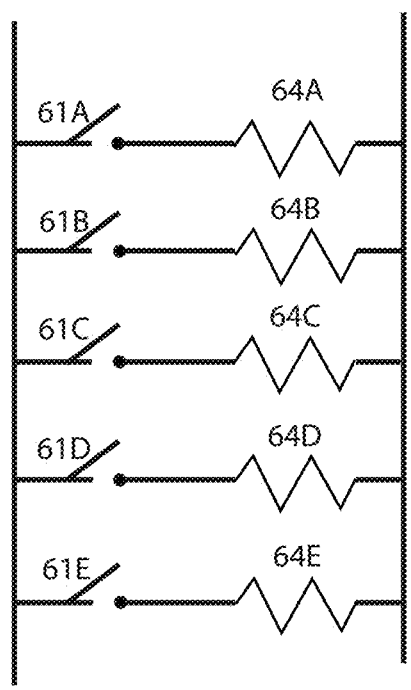
FIG. 16 is a schematic illustration of reed switches and resistors used to monitor water level in the water heater.

FIG. 16 shows the array of five reed-switches 61A, 61B, 61C, 61D, and 61E mounted on the circuit 60 board (not shown here) that is attached to the side of the upper part of the water heater, as shown in FIGS. 9 and 11 for the first heater embodiment 30 and in FIGS. 13 and 15A for the second heater embodiment 130. The reed switches are used to sense the water level in the water heater. This is accomplished as shown in circuit diagram in FIG. 16, which applies to both of the water heaters of FIGS. 6-12 and of FIGS. 13-15B. When a magnet 62 passes by each reed switch, the magnetic flux generated by the magnet will close that reed switch, which will allow current to flow through a resistor in series with the reed switch. Each of resistors 64A, 64B, 64C, 64D, and 64E are of a different resistance, which will be recognized by the circuit in a manner known in the art. Referring back to FIG. 9, magnet 62 is enclosed in a float 63 guided by a set of vertical ribs 65 to rise and sink with the water level in the water heater. Alternatively, referring back to FIG. 15A, magnet 162 is enclosed in a float 163 guided by a set of vertical ribs 265 to rise and sink with the water level in the water heater.

Figure 17:
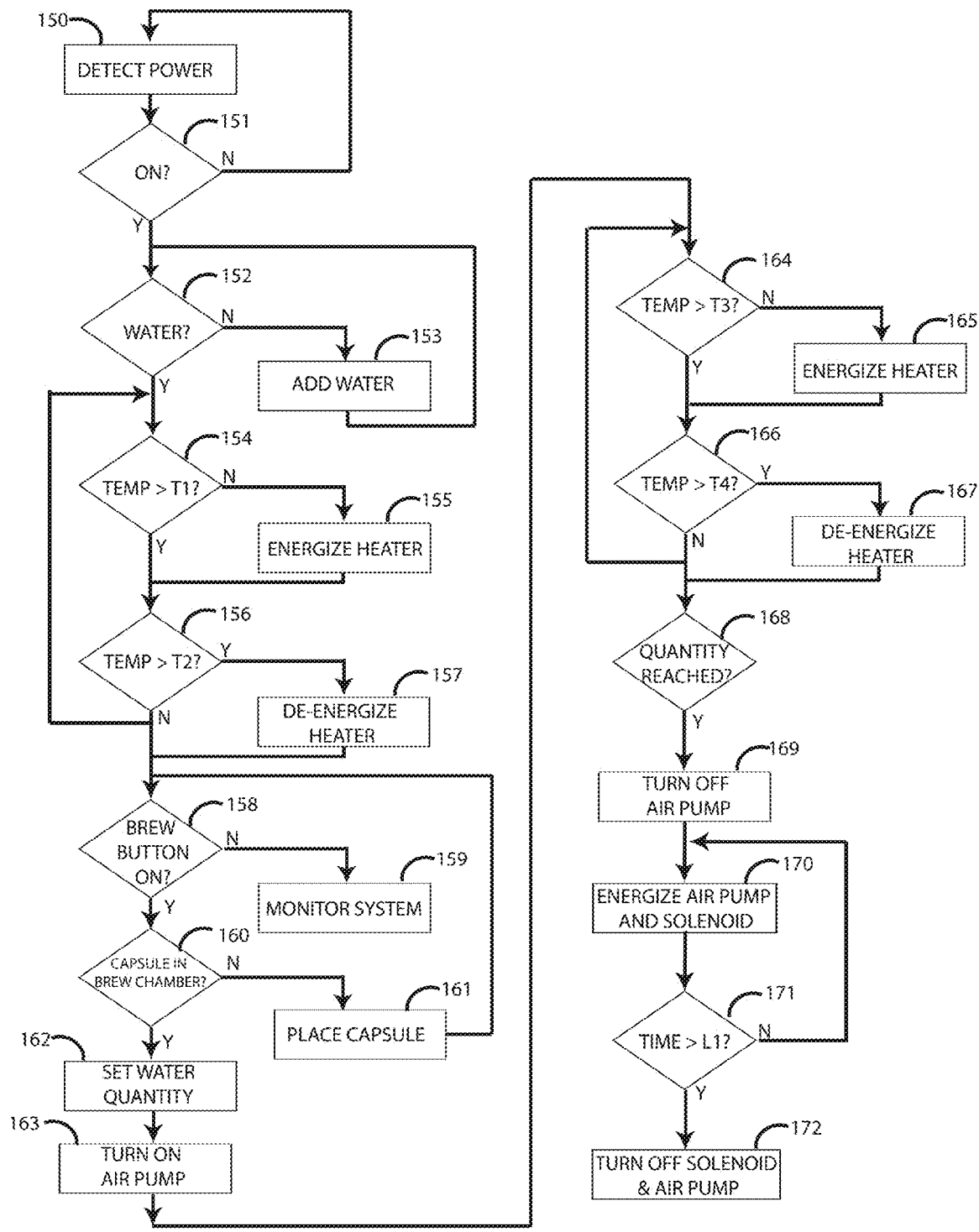
FIG. 17 is a flow chart of the operation of the apparatus according to the invention.

FIG. 17 is a basic flow diagram for outlining the logical operations that can occur within a controller including the control circuit (not shown), which is used in conjunction with either of the afore-described water heaters. When the apparatus 1 is plugged into an outlet, the control circuit is enabled and step 150 senses the existence of a full power status. When that condition is realized, step 151 transfers control to step 152 and may at that point also energize a power-on annunciator. Step 152 reads the input signal from the water level sensor 61A in FIG. 15A. If insufficient water exists, the user receives a notification as the slow flashing of a light. Step 152 waits for water to be added by the user in step 153. When that task is completed, step 154 determines whether the water temperature is above a first operating threshold, typically set at the bottom of an acceptable "pre-infusion" temperature range. On initialization this typically will not be the situation, so control passes from step 154 to step 155 to energize the heater 41. Steps 156 and 157 monitor the water temperatures for values in excess of an upper limit of an acceptable range for de-energizing the heater 41 in step 157. As shown this control sensor enters into a loop including steps 154 through 157 thereby to constantly control the temperature of the water during the pre-infusion cycle.

Once the "pre-infusion" water temperature is in an appropriate range, the user receives a notification as the steady illumination of a "ready" light. This may initiate a time-out to limit the maximum interval before any of the brew buttons 5A, 5B, or 5C in FIG. 1 are actuated. The time-out interval terminates the operation of the heater 41. Once a brew button, (either button 5A, 5B or 5C) is actuated, control passes to step 160 to determine the presence of a capsule in the brew chamber by monitoring the interlock switch (not shown). When both the conditions of steps 158 and 160 are met within the time-out interval control passes from step 158 to step 162 to set water quantity which is accomplished by depressing a button, either 5A, 5B or 5C each corresponding respectively to a resistance values of resistors 64B; C; or D, As will be apparent, such switches should be ganged so only one of the three switches can be depressed at any time. Step 162 sets water quantity based on the setting that corresponds with either switch 5A, 5B or 5C. When that task is completed, step 164 determines whether the water temperature is above a second operating threshold T3, typically set at the bottom of an acceptable "infusion" temperature range. This typically will not be the situation, so control passes from step 164 to step 165 to energize the heater 41. Steps 166 also monitors the water temperatures for values in excess of an upper limit of an acceptable range T4 for de-energizing the water heater in step 167. As shown this control sensor enters into a loop including steps 164 through 167 thereby to constantly control the temperature of the water during the "infusion" cycle. When that condition is met control passes from step 162 to step 163, turning on the air pump to deliver hot water into the brew chamber. Control passes from step 163 to step 168 recognizing when the selected quantity is reached by comparing the resistance selected in step 162 to the one that is activated by the movement of the magnet and its activation of the reed switches in its path. When that condition is met control passes from step 163 to step 169 which de-energizes the pump 50. When that condition is met control passes from step 169 to step 170, turning on the air pump and energizes the solenoid 99. When that condition is met control passes from step 170 to step 171 for comparing the "on" time to the selected time, typically being 2-3 seconds. when that condition is met control passes to step 172, de-energizing the solenoid and air pump thereby returning air valve to its default positions (as in FIG. 5C) which exposes the top of the water heater 30 to atmosphere allowing water to flow in from the tank 8 till the whole water heater is filled. Concurrently control passes to step 152.

The above and other aspects of the invention will be appreciated from the detailed description and drawings. It should be understood that although aspects of the invention have been described with reference to an exemplary embodiment including alternative variations thereto, aspects of the invention are not limited to the embodiments described. Also, aspects of the invention may be used alone, or in any suitable combination with other aspects of the invention.

We claim:

1. A hot beverage maker comprising:
   a fresh water tank vented to atmosphere;
   a water heater having an air inlet, a hot water outlet, a fresh water inlet in fluid communication with the fresh water tank to receive fresh water there-from for heating, an electric heating element for heating the received water, one or more thermal sensors for evaluating one or more temperatures of the received water, a primary monitor and at least one secondary monitor for sensing two or more levels of the received water within the water heater;
   an infusion compartment for containing infusible material, the infusion compartment having an infused beverage outlet and a hot water inlet in fluid communication with the hot water outlet;
   an infused beverage container that receives infused beverage from the infused beverage outlet;
   an air pump with a pressurized air outlet;
   an air valve having a plurality of ports, the air valve selectably enabling one or more from a plurality of air flow paths between the plurality of ports; and
   a control circuit for receiving and processing signals from the primary and at least one secondary monitor whereby
   a first signal from the primary monitor indicates that the received water in the water heater is at a maximum level and causes the control circuit to enable the air pump and establish a first of the airflow paths to divert pressurized air from the air pump into the water heater to cause heated water from the water heater to flow through the hot water outlet to the hot water inlet of the infusion compartment to infuse the infusible material; and whereby
   a second signal from the at least one secondary monitor causes the control circuit to establish a second of the air flow paths that blocks pressurized air flow from the pump, thereby terminating water delivery from the water heater, and that connects the interior of the heater to atmosphere to allow water from the fresh water tank to flow through the fresh water inlet into the water heater.

2. A hot beverage maker according to claim 1 wherein the water heater comprises a side wall, a top, and a base establishing an interior volume for containing water to be heated.

3. A hot beverage maker according to claim 1 wherein the second of the air flow paths also enables pressurized air from the air pump to be diverted into the infusion compartment for drying the infusible material after of the infusible material has been infused.

4. A hot beverage maker according to claim 3 wherein the water heater comprises a base and the electric heating element and thermal sensors are in thermal communication with the water there-within and located at or near the base.

5. A hot beverage maker according to claim 2 wherein the water outlet extends inwardly into the interior volume and has a water inlet opening at or near to the base.

6. A hot beverage maker according to claim 5 wherein the water inlet extends inwardly into the interior volume and has an outlet opening at or near to the base.

7. A hot beverage maker according to claim 2 wherein the air inlet communicates with the interior volume near or at the top.

8. A hot beverage maker according to claim 1 further comprising a check valve for denying the fluid communication of the water inlet with the fresh water tank when a pressure within the water heater exceeds a predetermined pressure level.

9. A hot beverage maker according to claim 3 wherein the primary monitor and at least one secondary monitor comprise a buoyant magnet vertically movable with a vertically variable water level within the water heater and at least one switch located exterior of the water heater that is activated by proximity to the magnet.

10. A hot beverage maker according to claim 3 wherein the primary monitor and at least one secondary monitor comprise electric terminals which are in electrical communication through water within the water heater when the water is at or exceeds predetermined water levels, and which are not in electrical communication when the water is below the predetermined water levels.

11. A hot beverage maker according to claim 1 wherein the plurality of ports is three; a first of the three in communication with the air pump, a second of the three in communication with the water heater, and a third of the three in communication with atmosphere; whereby the air valve first enables a first from the plurality of air flow paths, enabling communication between the first and second ports to enable pressurized air from the air pump to cause flow of heated water from the water heater through the infusion compartment into the infused beverage container; and the air valve then enables a second from the plurality of air flow paths, enabling communication between the second and third ports to enable escape of air from the water heater to thereby allow the flow of water from the fresh water tank into the water heater.

12. A hot beverage maker according to claim 11 wherein the air valve comprises:

a hollow cylindrical body with the three ports;
a spring;
a seal within the hollow cylindrical body slideable between a first and a second position and biased by the spring towards the first position; wherein
the seal forms and sealingly separates first and second valve compartments within the hollow cylindrical body; wherein
energization of the air pump causes pressurized air therefrom into the first port to force the seal to slide against the bias of the spring, such that the first valve compartment connects the first and second ports, allowing pressurized air from the air pump to cause the flow of heated water from the water heater through the infusion compartment into the infused beverage container; and
de-energization of the air pump allows the bias of the spring to force the seal such that the second valve compartment connects the second and third ports, enabling the escape of air from the water heater to thereby allow the flow of water from the fresh water tank into the water heater.

13. A hot beverage maker according to claim 12 wherein the first compartment comprises a vent to allow air therewithin to escape upon de-energization of the air pump so that the bias of the spring may force the seal to connect the second and third ports.

14. A hot beverage maker according to claim 1 wherein the plurality of ports is four; a first of the four in communication with the air pump, a second of the four in communication with the water heater, and a third of the four in communication with the infusion compartment, and a fourth of the four in communication with atmosphere; whereby the air valve first enables a first from the plurality of air flow paths, enabling communication between the first and second ports to enable pressurized air from the air pump to cause flow of heated water from the water heater through the infusion compartment into the infused beverage container; and the air valve then enables second and third from the plurality of air flow paths, the second enabling communication between the second and fourth ports, to enable the escape of air from the water heater to thereby allow the flow of water from the fresh water tank into the water heater, and the third enabling communication between the first and third ports, to allow pressurized air from the air pump into the infusion compartment to dry the infusible material therein.

15. A hot beverage maker comprising:

a fresh water tank vented to atmosphere;
a water heater having an air inlet, a hot water outlet, and a fresh water inlet in fluid communication with the fresh water tank to receive fresh water there-from for heating;
an infusion compartment for containing infusible material, the infusion compartment having an infused beverage outlet and a hot water inlet in fluid communication with the hot water outlet;
an infused beverage container that receives infused beverage from the infused beverage outlet;
an air pump with a pressurized air outlet; and
an air valve having a plurality of ports, the air valve selectably enabling one or more from a plurality of air flow paths between the plurality of ports; whereby
the air valve enables a first airflow path to allow pressurized air from the air pump to cause heated water from the water heater to flow through the hot water outlet to the hot water inlet of the infusion compartment to infuse the infusible material; and then
the air valve enables a second air flow path to allow water from the fresh water tank to flow through the fresh water inlet into the water heater;
wherein the plurality of ports is four; a first of the four in communication with the air pump, a second of the four in communication with the water heater, and a third of the four in communication with the infusion compartment, and a fourth of the four in communication with atmosphere; whereby
the air valve first enables a first from the plurality of air flow paths, enabling communication between the first and second ports to enable pressurized air from the air pump to cause flow of heated water from the water heater through the infusion compartment into the infused beverage container; and
the air valve then enables second and third from the plurality of air flow paths, the second enabling communication between the second and fourth ports, to enable the escape of air from the water heater to thereby allow the flow of water from the fresh water tank into the water heater, and the third enabling communication between the first and third ports, to allow pressurized air from the air pump into the infusion compartment to dry the infusible material therein; and
wherein the valve comprises a hollow cylindrical body with the four ports, and two seals mounted on a rod to form a first valve compartment there-between and a second valve compartment there-beside;
and wherein the seals and rod are slideable together within the hollow cylindrical body by influence of a solenoid to cause sliding of the first and second valve compartments within the hollow cylindrical body; and wherein the valve compartments have a first position when the solenoid is energized and a second position when the solenoid is de-energized; and wherein during the first position the first valve compartment connects the first port to the second port to allow pressurized air from the air pump to cause heated water to flow from the water heater to the infusion chamber; and during the second position the first valve compartment connects the first port to the third port to allow pressurized air from the air pump into the infusion compartment to dry the infusible material therein, and the second valve compartment connects the second port to the fourth port to enable the escape of air from the water heater to thereby allow the flow of water from the fresh water tank into the water heater.

16. A hot beverage maker comprising:
a fresh water tank vented to atmosphere;
a water heater having an air inlet, a hot water outlet, and a fresh water inlet in fluid communication with the fresh water tank to receive fresh water there-from for heating;
an infusion compartment for containing infusible material, the infusion compartment having an infused beverage outlet and a hot water inlet in fluid communication with the hot water outlet;
an infused beverage container that receives infused beverage from the infused beverage outlet;
an air pump with a pressurized air outlet; and
an air valve having a plurality of ports, the air valve selectably enabling one or more from a plurality of air flow paths between the plurality of ports; whereby
the air valve enables a first airflow path to allow pressurized air from the air pump to cause heated water from the water heater to flow through the hot water outlet to the hot water inlet of the infusion compartment to infuse the infusible material; and then
the air valve enables a second air flow path to allow water from the fresh water tank to flow through the fresh water inlet into the water heater;
wherein the plurality of ports is four; a first of the four in communication with the air pump, a second of the four in communication with the water heater, and a third of the four in communication with the infusion compartment, and a fourth of the four in communication with atmosphere; whereby the air valve first enables a first from the plurality of air flow paths, enabling communication between the first and second ports to enable pressurized air from the air pump to cause flow of heated water from the water heater through the infusion compartment into the infused beverage container; and the air valve then enables second and third from the plurality of air flow paths, the second enabling communication between the second and fourth ports, to enable the escape of air from the water heater to thereby allow the flow of water from the fresh water tank into the water heater, and the third enabling communication between the first and third ports, to allow pressurized air from the air pump into the infusion compartment to dry the infusible material therein; and wherein the air valve comprises:
a hollow cylindrical body with the first, second, third, and fourth ports;
a spring;
a first seal within the hollow cylindrical body slideable between a first and a second position and biased by the spring towards the first position, wherein the seal forms and sealingly separates first and second valve compartments within the hollow cylindrical body; and
a divider in said cylindrical body with an aperture that may be opened and closed by a second seal activated by a solenoid; wherein
while said aperture is closed, energization of the air pump causes pressurized air there-from to force the first seal to slide against the bias of the spring, such that the first valve compartment connects the first and second ports, allowing pressurized air from the air pump to cause the flow of heated water from the water heater through the infusion compartment into the infused beverage container; and whereby
said second seal causes said aperture to open, there-upon reducing pressure in said first valve compartment, resulting in the first port connecting to the third port to allow pressurized air from the air pump into the infusion compartment to dry the infusible material therein, and causing the first seal to be biased by said spring to connect the second port to the fourth port to enable escape of air from the water heater to thereby allow the flow of water from the fresh water tank into the water heater.

17. The hot beverage maker of claim 1 wherein the control circuit is manually programmable to allow selection only from the at least one secondary monitor from which the second airflow path is established.

* * * * *